United States Patent
Sun et al.

(10) Patent No.: US 10,114,949 B2
(45) Date of Patent: Oct. 30, 2018

(54) TECHNIQUES FOR MONITORING INTEGRITY OF OS SECURITY ROUTINE

(71) Applicant: McAfee, LLC, Santa Clara, CA (US)

(72) Inventors: Mingqiu Sun, Beaverton, OR (US); Rajesh Poornachandran, Portland, OR (US); Ned M. Smith, Beaverton, OR (US); Vincent J. Zimmer, Federal Way, WA (US); Sven Schrecker, Santa Clara, CA (US); Gopinatth Selvaraje, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 175 days.

(21) Appl. No.: 14/757,946

(22) Filed: Dec. 24, 2015

(65) Prior Publication Data

US 2017/0185771 A1  Jun. 29, 2017

(51) Int. Cl.
- H04L 29/06 (2006.01)
- G06F 21/56 (2013.01)
- G06F 21/57 (2013.01)

(52) U.S. Cl.
CPC .......... *G06F 21/56* (2013.01); *G06F 21/57* (2013.01); *H04L 63/1425* (2013.01); *H05K 999/99* (2013.01)

(58) Field of Classification Search
CPC .......................... G06F 21/56; H04L 63/1425
See application file for complete search history.

(56) References Cited

U.S. PATENT DOCUMENTS

| 2008/0015808 A1* | 1/2008 | Wilson | G06F 21/51 |
| | | | 702/123 |
| 2010/0223656 A1* | 9/2010 | Ray | G06F 21/57 |
| | | | 726/3 |
| 2010/0235912 A1* | 9/2010 | Hermann | G06F 21/57 |
| | | | 726/23 |
| 2012/0166795 A1* | 6/2012 | Wood | G06F 21/57 |
| | | | 713/155 |

(Continued)

OTHER PUBLICATIONS

Gagliordi, Natalie, "McAfee outlines its plan to secure the Internet of Things", Between the Lines, <http://www.zdnet.com/article/mcafee-outlines-its-plan-to-secure-the-internet-of-things/>, Apr. 9, 2014, 3 pages.

*Primary Examiner* — Jeffrey C Pwu
*Assistant Examiner* — William A Corum, Jr.
(74) *Attorney, Agent, or Firm* — Byrne Poh LLP

(57) ABSTRACT

Various embodiments are generally directed to techniques for monitoring the integrity of an operating system (OS) security routine that checks the integrity of an OS and/or one or more application routines. An apparatus may include a first processor component to execute an operating system (OS) in a first operating environment within a processing device and to execute an OS security routine to recurringly verify an integrity of the OS; a challenge component within a second operating environment within the processing device that is isolated from the first operating environment to recurringly challenge the OS security routine to provide a measure of itself; and a response component within the second operating environment to analyze each measure provided by the OS security routine and an elapsed time to receive each measure from the OS security routine to verify an integrity of the OS security routine.

15 Claims, 13 Drawing Sheets

(56) References Cited

U.S. PATENT DOCUMENTS

| | | | | |
|---|---|---|---|---|
| 2012/0260345 | A1* | 10/2012 | Quinn | G06F 21/57 |
| | | | | 726/26 |
| 2014/0359239 | A1* | 12/2014 | Hiremane | G06F 21/575 |
| | | | | 711/163 |
| 2015/0026472 | A1* | 1/2015 | Sweet | H04L 63/0428 |
| | | | | 713/168 |
| 2015/0263855 | A1* | 9/2015 | Schulz | H04L 9/0827 |
| | | | | 713/155 |
| 2015/0347768 | A1* | 12/2015 | Martin | G06F 21/62 |
| | | | | 726/1 |
| 2017/0185771 | A1* | 6/2017 | Sun | G06F 21/56 |

\* cited by examiner

TECHNIQUES FOR MONITORING INTEGRITY OF OS SECURITY ROUTINE

BACKGROUND

As the use of security routines to verify the integrity of operating systems and/or of application routines executed within the operating environments of operating systems has become commonplace, those security routines have themselves become the targets of malicious software (e.g., such malware as viruses, worms, etc.). Indeed, malicious software is often written with a presumption having been made that there will be a security routine of some type that must first be defeated before whatever malicious actions that are intended against the operating system and/or application routines are able to be performed (e.g., logging keystrokes, stealing data, sending unsolicited emails to other processing devices, etc.).

As a result, various approaches have been proposed for addressing efforts by malicious software to attack such security routines. Such proposals have included creating a second operating environment that is entirely separate from the operating environment in which an operating system and/or application routines are executed through the provision of a separate processor component and/or storage. Unfortunately, the wide range of processor-intensive functions that may be performed by such security routines may require that such a separate processor component have considerable processing capabilities and/or that such a separate storage have considerable capacity. Stated differently, the second operating environment may require processing and/or storage resources that might rival those of the operating environment in which operating system and/or the application routines are executed, and such duplication of processing and/or storage resources to create such a second operating environment may be deemed cost-prohibitive and/ or inefficient in terms of electric power consumption.

DETAILED DESCRIPTION

Figure 1A:
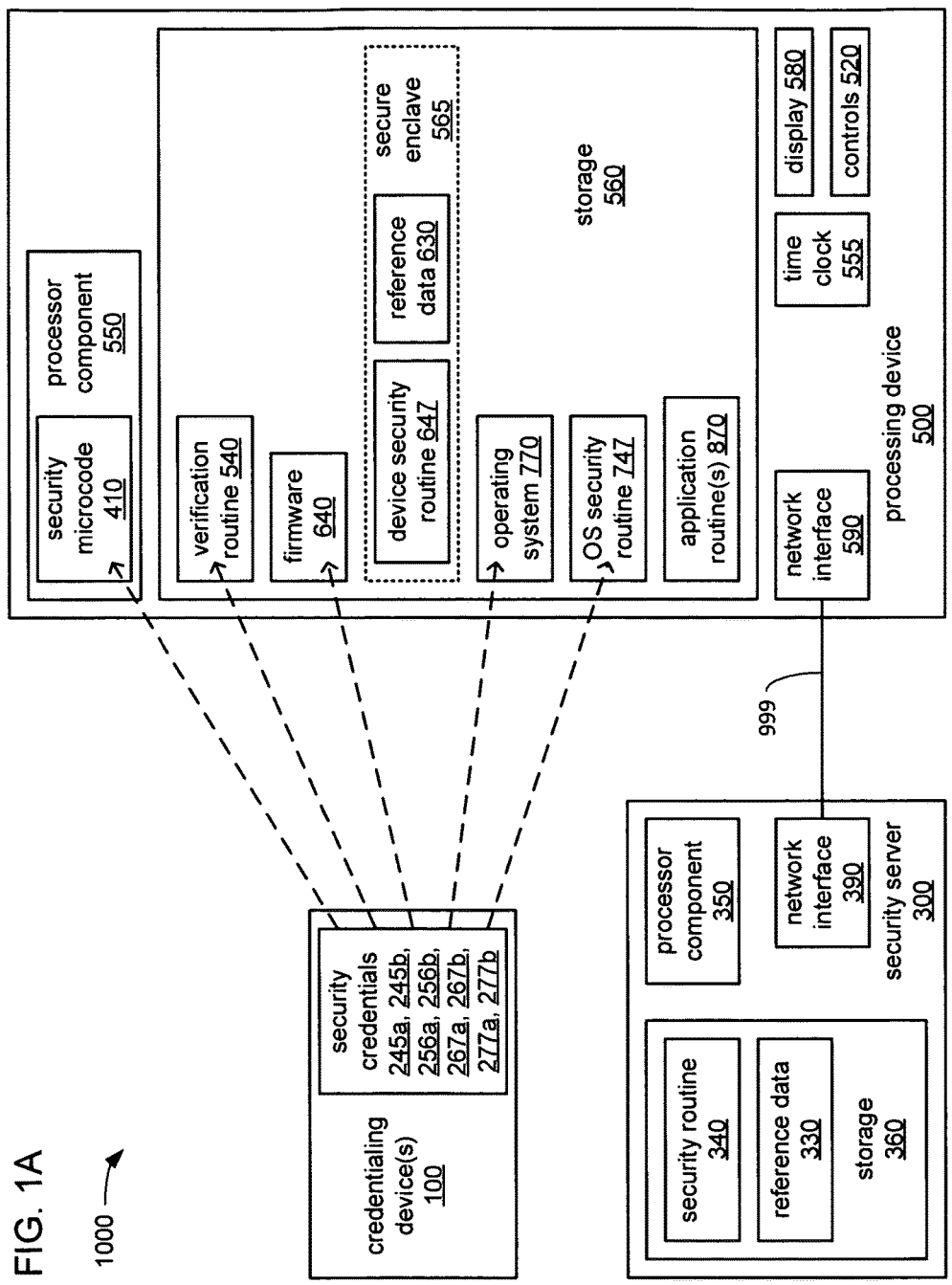
FIGS. 1A and 1B each illustrate an example embodiment of a secure processing system.

Various embodiments are generally directed to techniques for monitoring the integrity of an operating system (OS) security routine that checks the integrity of an OS and/or one or more application routines. The OS security routine may be executed in the operating environment generated by the OS as the OS is executed by a main processor component of a processing device. In some embodiments, the OS security routine may be executed within a portion of the storage of the processing device to which access by other routines, including routines of the OS, may be restricted such as a container or secure enclave. The OS security routine may, at various times, analyze at least a portion of the OS and/or of one or more application routines to check the integrity thereof and/or to detect malicious software. The OS security routine may provide indications of the results of such analyses to a device security routine that is executed within a trusted operating environment within the processing device such as within a secure enclave or within a controller that includes a controller processor component and/or controller storage that are isolated from the main processor component and/or the main storage employed for the OS and/or the one or more application routines. Alternatively or additionally, the OS security routine may provide such indications to a security server coupled to the processing device via a network. The device security routine may recurringly check the integrity of the OS security routine via a challenge-and-response mechanism in which the OS security routine is expected to derive a measure of at least a portion of itself and provide that measure to the device security routine within a predetermined period of time. The device security routine may then determine whether the integrity of the OS security routine is still intact based on the measure so provided and/or on the amount of time required for it to be provided. The device security routine may provide indications of the results of such determinations to the security server via the network.

At least during initialization of the processing device, security microcode incorporated into either the main processor component or the controller processor component may serve as an initial portion of a chain of trust. The security microcode and/or a verification routine that is verified by the security microcode may attempt to authenticate a firmware as trustworthy. Upon successful authentication of the firmware, thereby extending the chain of trust to the firmware, the main processor component may execute the firmware to perform various initialization and configuration tasks to prepare the processing device to execute the OS. Following the performance of such initialization and configuration tasks, the firmware may attempt to authenticate the OS as trustworthy. Upon successful authentication of the OS, thereby extending the chain of trust to the OS, the processor component may load portions of the OS in preparation for booting the OS. Upon booting the OS, the OS may attempt to authenticate the OS security routine as trustworthy. Upon successful authentication of the OS security routine, thereby extending the chain of trust to the OS security routine, the device security routine, which may be incorporated into the firmware, may be triggered to challenge the OS security routine to provide an initial measure of at least a portion of itself to the device security routine. The device security routine may analyze the initial measure provided by the OS security routine to attempt to verify the integrity of the OS security routine at a time prior to its use to verify the integrity of at least a portion of the OS and/or of one or more application routines.

As the OS security routine derives and provides the initial measure, the OS security routine may modify itself in a manner that will cause a subsequent measure taken of at least a portion of the OS security routine to differ from the initial measure in a predictable manner that allows the subsequent measure to also be used to verify the integrity of the OS security routine. In some embodiments, the OS security routine may modify itself each time it is challenged by the device security to provide a measure in a predictable manner that allows each following measure to also be used to verify the integrity of the OS security routine. Among the measures that may be taken of at least a portion of the OS security routine may be various forms of hash, including and not limited to, Secure Hash Algorithm (SHA) 0-3, or any of a variety of types of checksum. In some embodiments, the device security routine may vary the type of measure that it challenges the OS security routine to provide with each challenge. In some embodiments, the device security routine may maintain a copy of the OS security routine to use in independently deriving the same measures of the OS security routine that the device security routine challenges the OS security routine to provide, and may compare the measures that it so derives to those it receives from the OS security routine. In other embodiments, the device security routine may maintain copies of the measures that are expected to be received from the OS security routine, and may compare those copies to the measures it receives from the OS security routine.

In still other embodiments, the device security routine may offload to the security server at least a portion of the work of deriving measures to use in comparisons to measures received from the OS security routine and/or of the work of performing other aspects of recurringly checking the integrity of the OS security routine. By way of example, the security server may maintain a copy of the OS security routine to use in independently deriving the same measures of the OS security routine that the device security routine challenges the OS security routine to provide. Such use of the security server may be deemed desirable in embodiments in which the device security routine does not have access to sufficient processing and/or storage resources to perform such derivations, such as embodiments in which the device security routine is executed by a controller processor component having considerably less processing resources than the main processor component.

The OS security routine may employ any of a variety of approaches to verifying at least a portion of the OS and/or of one or more application routines. In some embodiments, the OS security routine may function as a loader employed by the OS to load one or more portions of the OS and/or of one or more application routines. During such loading, the OS security routine may preemptively execute instructions of a portion of the OS and/or of the one or more application routines under controlled conditions to determine what those instructions will attempt to do if allowed to be executed normally. In some embodiments, the OS security routine may employ indications of patterns of instructions and/or of data associated with specific pieces of malware to scan portions of the OS and/or of the one or more application routines. In some embodiments, there may be different versions of the OS security routine with different ones generated for use with different versions of the OS. By way of example, there may be multiple versions of the OS security routine that are each for use with a different one of the various versions of the Windows OS proffered by Microsoft Corporation of Redmond, Wash., and/or there may be multiple versions of the OS security routine that are each for use with a different distribution of the Linux OS proffered by various vendors. Thus, in such embodiments, the specific approach(es) employed to verify at least a portion of the OS and/or of one or more application routines may differ for different versions of the OS.

Regardless of the exact mechanism(s) employed by the OS security routine to verify the integrity of the OS and/or the one or more applications, the OS security routine may provide indications of the results of its attempts to verify the OS to the device security routine. In some embodiments, in response to an indication received from the OS security routine that the integrity of the OS and/or one of the one or more applications may have compromised, the device security routine may take any of a variety of actions to correct the situation and/or to limit the consequences thereof. By way of example, the device security routine may trigger a reinitialization of the processing device and/or take other steps to cause a rebooting of the OS in an effort to clear a corrupted OS and/or one or more corrupted application routines from storage. Alternatively or additionally, the device security routine may disable one or more interfaces that couples the processing device to one or more other devices to deny access to those other devices to what may be presumed to be a piece of malicious software that caused the corruption. In other embodiments, it may be the OS security routine that takes such action.

In some embodiments, one or both of the OS security routine and the device security routine may transmit indications of the results of the checks recurringly performed by each to the security server. In response to an indication received from the OS security routine that the integrity of the OS and/or one of the one or more applications may have compromised, the security server may take any of a variety of actions to correct the situation and/or to limit the consequences thereof. Alternatively or additionally, the security server may take nay of a variety of actions in response to an indication received from the device security routine that the integrity of the OS security routine may have been compromised. By way of example, the security server may remotely trigger a reinitialization of the processing device and/or take other steps to cause a rebooting of the OS in an effort to clear a corrupted OS, one or more corrupted application routines and/or a corrupted OS security routine from storage. Alternatively or additionally, the device security routine may remote trigger a disabling of one or more interfaces that couples the processing device to one or more other devices to deny access to those other devices to what may be presumed to be a piece of malicious software that caused the corruption. Such an interface that may be so remotely disabled may be a network interface by which the processing device is coupled to the network by which it communicates with the security server. Also alternatively or additionally, the security server may remotely signal other processing devices to cease communications with the processing device via the network.

In some of these embodiments, one or more components of the processing device may be selected to conform to aspects of the IA-32 architecture promulgated by Intel Corporation of Santa Clara, Calif. and/or to aspects of the Unified Extensible Firmware Interface promulgated by the UEFI Forum of Beaverton, Oreg. In such embodiments, the processor component may be one of the Intel Corporation Pentium, Itanium or Core series processor components, the security microcode may be incorporated into the processor component during fabrication by Intel Corporation, the verification routine may be an Authenticated Code Module (ACM) provided by Intel Corporation, the firmware may be a Basic Input/Output System (BIOS) provided by any of a variety of sources, and the OS may be a version of Windows from Microsoft Corporation of Redmond, Wash., or a version of Linux provided by any of a variety of sources.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an embodiment of a secure processing system 1000 incorporating one or more credentialing devices 100, a security server 300 and/or a processing device 500. In the secure processing system 1000, one or more matched sets of security credentials may be provided by the one or more credentialing devices 100 for use by one or more pairs of components of the processing device 500 to enable a chain of trust to be formed thereamong during initialization of the processing device 500. Following initialization of the processing device 500 and the establishment of that chain of trust, the security server 300 may cooperate with one or more of those components to monitor one or more other components as part of maintaining that chain of trust.

As depicted, at least the security server 300 and the processing device 500 may exchange data associated with maintaining that chain of trust through a network 999. Also, at least a portion of that data may be so exchanged in encrypted form to prevent reading and/or modification thereof. However, one or more of these devices may exchange other data entirely unrelated to the chain of trust among components within the processing device 500 with each other and/or with still other devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the processing device 500 may incorporate a processor component 550, a storage 560, a time clock 555, manually-operable controls 520, a display 580 and/or a network interface 590 to couple the processing device 500 to the network 999. The processor component 550 may incorporate microcode to control various aspects of its operation, including security microcode 410. Although the time clock 555 is not depicted as incorporated into any other component of the processing device 500, in some embodiments, the time clock 555 may be incorporated into the processor component 550 or into a support component (not shown) that may provide various forms of hardware-implemented support logic to the processor component 550 (e.g., a bus interface to one or more other components of the processing device 500).

The storage 560 may store a verification routine 540, a firmware 640, a device security routine 647, a reference data 630, an operating system (OS) 770, an OS security routine 747, and one or more application routines 870. As depicted, a portion of the storage space within the storage 560 may be occupied by a secure enclave 565 that may be based on any of a variety of mechanisms that restrict access to its contents by executable routines stored and executed externally of the secure enclave 565. As depicted, at least the device security routine 647 may be stored and executed within the secure enclave 565 as a measure to protect the integrity of the device security routine 647 against malicious routines that may be stored and/or executed externally of the secure enclave 565 in the operating environment of the OS 770. The reference data 630 may also be stored within the secure enclave 565 to protect its integrity as it is used by the device security routine 647. The such security for the secure enclave 565 may be based on any of a variety of known and commercially available mechanisms for isolating operating environments, including and not limited to, the TrustZone® extension of the ARM® architecture offered by ARM Ltd. of Cambridge, England; one of the Software Guard Extensions (SGX), Trusted Execution Technology (TXT), Virtualization Technology extensions (VT-X or VT-d) offered by Intel® Corporation of Santa Clara, Calif., USA; and the Simplified Mandatory Access Control Kernel (SMACK) security module offered by various purveyors of various distributions of the Linux® operating system.

Although not specifically depicted, the storage 560 may include a removable storage medium (e.g., an optical disc, solid-state memory device and/or hard drive that is removable from a casing of the processing device 500, etc.) from which one or more of these executable routines 540, 640, 647, 747, 770 and 870 may be copied into another portion of the storage 560 that may not be based on a removable storage medium (e.g., solid-state memory and/or a hard drive incorporated into a casing of the processing device 500). Alternatively or additionally, one or more of these executable routines may be retrieved from one portion of the storage 560 based on a non-volatile storage technology that does not require a constant supply of electricity to maintain these executable routines therein, and may be loaded into another portion of the storage 560 based on a volatile storage technology that enables faster access to the instructions of those executable routines, but that cannot retain them without the constant provision of electric power.

The security microcode 410, the verification routine 540, the firmware 640, the device security routine 647, the OS security routine 747, the OS 770, and/or the one or more application routines 870 may each incorporate a sequence of instructions operative on the processor component 550 to implement logic to perform various functions. As will be explained in greater detail, the processor component 550 may be caused by its execution of at least the security microcode 410 to begin to attempt to form a chain of trust among the processor component 550 and multiple ones of these executable routines. More specifically, execution of the security microcode 410 may cause the processor component 550 to attempt to authenticate the verification routine 540, and presuming such authentication is successful, execution of the verification routine 540 may cause the processor component 550 to attempt to authenticate the firmware 640. If authentication of the firmware 640 is successful, execution of the firmware 640 may cause the processor component 550 to attempt to authenticate the OS 770, and presuming such authentication is successful, execution of the OS 770 may cause the processor component 550 to attempt to authenticate the OS security routine 747. If authentication of the OS security routine 747 is successful, then a chain of trust will have been formed extending from the security microcode 410 to the OS security routine 747.

Such a chain of trust may include the device security routine 647 in embodiments in which the device security routine 647 is incorporated into and/or is authenticated by the firmware 640. The device security routine 647 may be maintained within the secure enclave 565, which may be created by the security microcode 410 and/or the firmware 640. As will be described in greater detail, the device security routine 647 may then begin ongoing monitoring of the integrity of the OS security routine 747, which in turn, may begin ongoing monitoring of the integrity of the OS 770 and/or of the one or more application routines 870. In performing such ongoing monitoring, one or more both of the device security routine 647 and the OS security routine 747 may communicate with the security server 300 via the network 999 to employ the security server 300 in derivations of measures and/or to transmit indications of instances of discovering loss of integrity thereto.

Figure 1B:
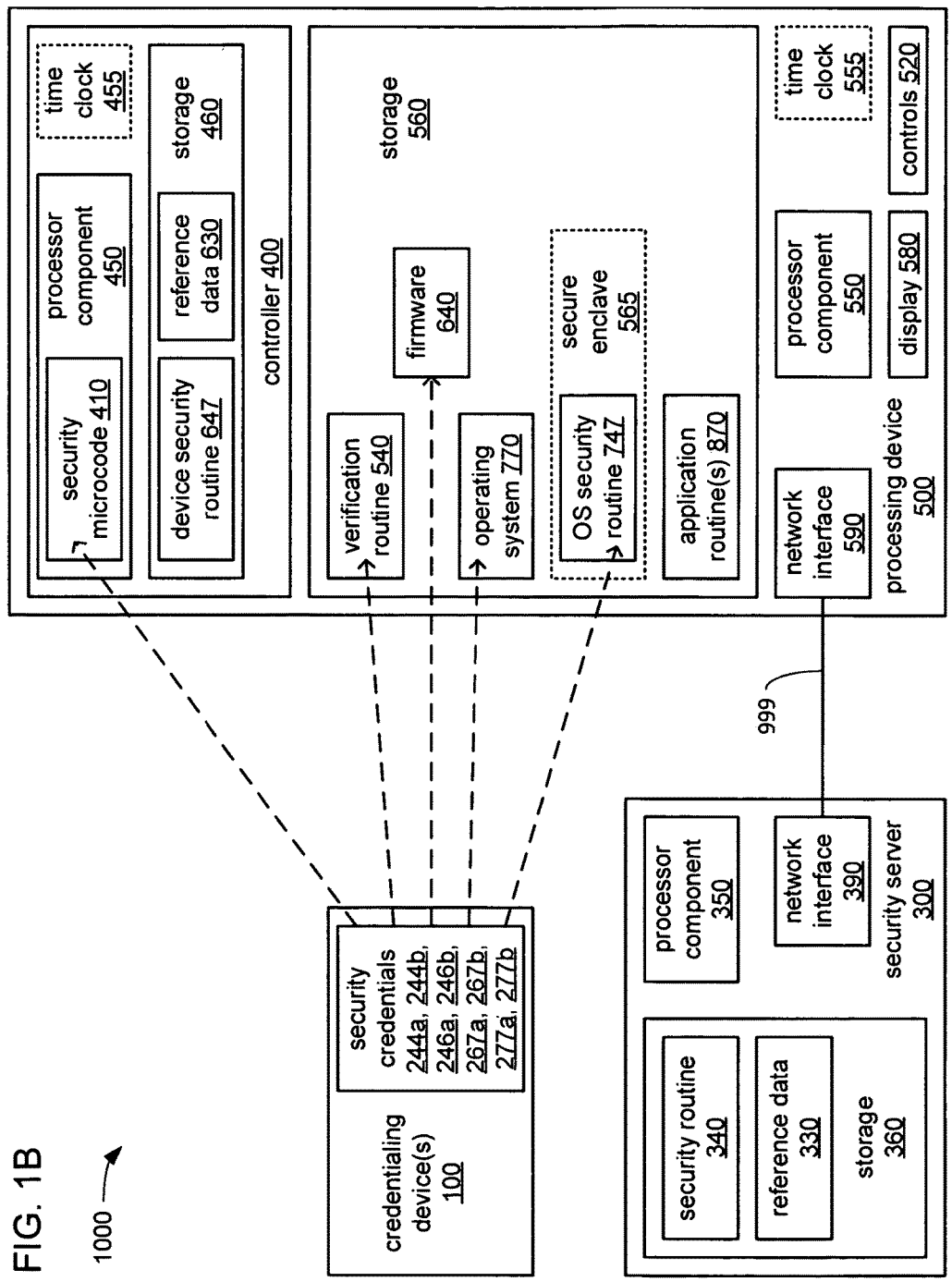

FIG. 1B illustrates a block diagram of an alternate embodiment of the secure processing system 1000 incorporating an alternate embodiment of the processing device 500. As depicted, the alternate embodiment of the processing device 500 may incorporate an additional processor component 450 and storage 460 within a controller 400. The processor component 450 may operate as a controller processor in a controller operating environment within the controller 400 that is isolated from the main processing environment in which the processor component 550 may operate as the main processor component of the processing device 500, and in which the processor component 550 may execute the OS 770. Such separation may be such as to render the controller operating environment of the controller 400 inaccessible to malicious software (e.g., "malware") that may infiltrate the main operating environment of the processor component 550 (e.g., by compromising the integrity of the OS 770). This may enable the controller 400 to perform various security-related functions through execution of routines within the controller 400 by the processor component 450 with at least some degree of assurance that those functions cannot be interfered with by malicious software present within the main operating environment.

As depicted, the processor component 450 may incorporate the security microcode 410 in lieu of the processor component 550 doing so. Thus, in the depicted alternate embodiment of the processing device 500 of FIG. 1B, it may be the processor component 450 that executes the security microcode 410, instead of the processor component 550. In this way, it may be the processor component 450 that attempts to authenticate the verification routine 540 as trustworthy from within the more secure controller operating environment of the controller 400 to form the initial portion of the chain of trust extending from the security microcode 410 to the OS security routine 747.

As also depicted, the device security routine 647 and the reference data 630 may be stored within the storage 460, instead of either being stored within the secure enclave 565 within the storage 560. Thus, instead of the processor component 550 executing the device security routine 647 as depicted in FIG. 1A to recurringly check the integrity of the OS security routine 747, the processor component 450 may so execute the device security routine 647 in FIG. 1B to perform such recurring security checks. Also, in some embodiments (and although not specifically depicted), the verification routine 540 and/or a copy of the OS security routine 747 may also be stored within the storage 460.

Figure 2A:
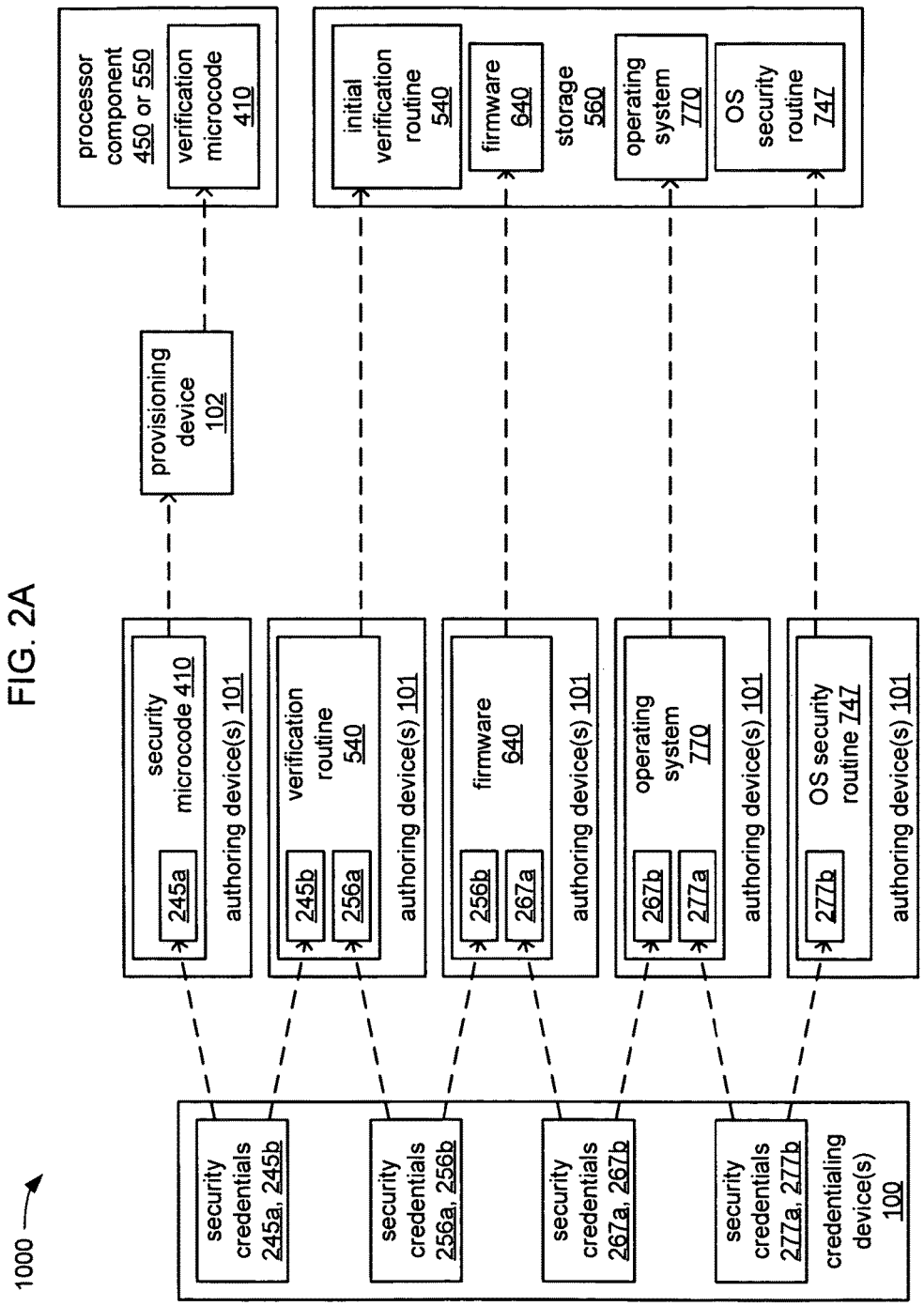
FIGS. 2A and 2B, together, illustrates an example embodiment of a providing security credentials to a processing device of the secure processing system of either FIG. 1A or 1B.
Figure 2B:
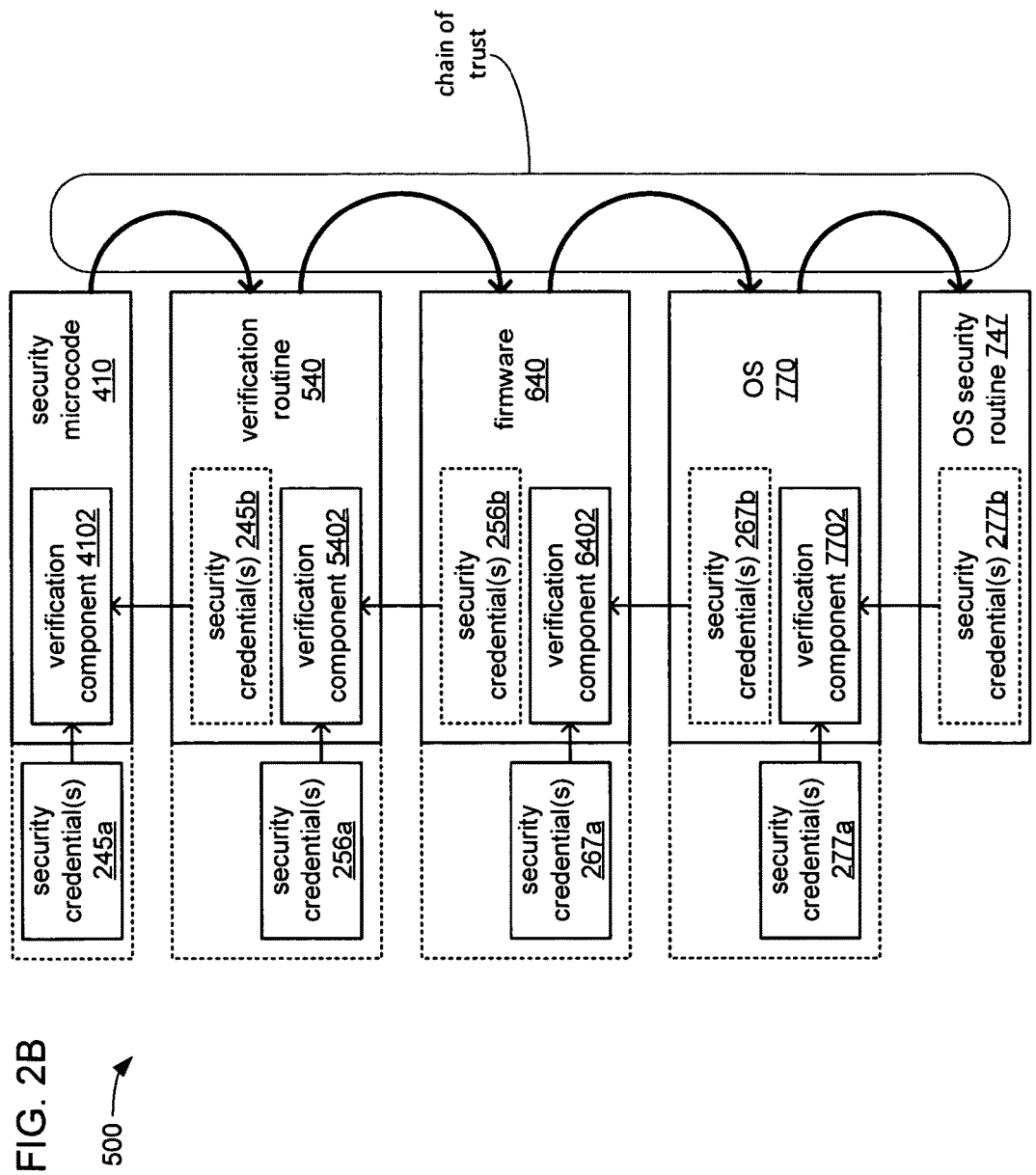

FIGS. 2A and 2B, together, depict aspects of an example of provisioning and use of matching security credentials to enable the aforedescribed attempts to authenticate executable routines. More specifically, FIG. 2A depicts aspects of provisioning of security credentials, and FIG. 2B depicts aspects of their use. Turning to FIG. 2A, each of the security microcode 410, the verification routine 540, the firmware 640, the OS 770 and the OS security routine 747 may be generated using different authoring devices 101. Each of the authoring devices 101 may be a server or other form of computing device executing a compiler and/or other tools for generating executable routines to generate a corresponding one of these executable routines 410, 540, 640, 770 and/or 747.

As familiar to those skilled in the art of developing components of a processing device, various hardware and software components of the processing device 500 may be provided for inclusion within the processing device 500 by different source entities (e.g., different corporate, educational and/or governmental entities) with little or no coordination therebetween, including such components as each of the processor components 450 and/or 550, and/or each of the executable routines 410, 540, 640, 770 and/or 747. As a result, different source entities may possess and operate different ones of the depicted authoring devices 101 to separately develop and generate different ones of the executable routines 410, 540, 640, 770 and/or 747. Again, by way of example, the processor component 450 or 550 may be provided by Intel Corporation of Santa Clara, Calif., along with the security microcode 410, the verification routine 540, the device security routine 647, and/or the OS security routine 747, while the firmware 640 may be provided by any of a variety of source entities. Again, the OS 770 may be a version of Windows provided by Microsoft Corporation of Redmond, Wash., or a version of Linux provided by any of a variety of source entities.

However, as also familiar to those skilled in the art, while the mere assembly of components from different source entities to form a processing device may be performed with little or no coordination thereamong, providing the ability for one component sourced by one such source entity to authenticate another component sourced by another such source entity often does require at least some degree of coordination among those entities to at least the extent of agreeing upon a source of the security credentials used in such authentication, such as encryption keys, seed values, etc. As a result, and as depicted, matching sets of security credentials may be provided to different ones of the authoring devices 101 associated with generating different ones of the executable routines 410, 540, 640, 770 and/or 747 to enable such authentication thereamong.

Turning to both FIGS. 2A and 2B, to enable the security microcode 410 to authenticate the verification routine 540, matching security credentials 245a and 245b may be provided to the different authoring devices 101 associated with generating each of these two executable routines 410 and 540. In some embodiments, the security credentials 245a provided to the authoring device(s) 101 employed in generating the security microcode 410 may include an encryption key to be embedded within the security microcode 410 (or to be otherwise included alongside the security microcode 410). Correspondingly, the security credentials 254b provided to the authoring device(s) 101 employed in generating the verification routine 540 may include a matching encryption key by which the verification routine 540 (or a hash thereof) may be digitally signed as the verification routine 540 is generated to enable the verification routine 540 to be authenticated by the security microcode 410 using the encryption key of the security credentials 254a. Again, and as will be discussed in greater detail, a successful authentication of the verification routine 540 by the security microcode 410 may enable the beginning of the formation of the chain of trust among the processor component 450 or 550, the security microcode 410 and the verification routine 540.

Correspondingly, similarly matching security credentials 256a and 256b may be provided to the authoring devices 101 associated with generating the verification routine 540 and the firmware 640 to enable the verification routine 540 to authenticate the firmware 640. Also, similarly matching security credentials 267a and 267b may be provided to the authoring devices 101 associated with generating the firmware 640 and the OS 770 to enable the firmware 640 to authenticate the OS 770. Further, similarly matching security credentials 277a and 277b may be provided to the authoring devices 101 associated with generating the OS 770 and the OS security routine 747 to enable the OS 770 to authenticate the OS security routine 747. It should be noted that each of the matching sets of security credentials 245a and 245b, 256a and 256b, 267a and 267b, and 277a and 277b may be provided by different credentialing devices 100 that may be possessed and operated by different entities, or that may be possessed and operated by a single entity agreed upon by all of the source entities that provide the different executable routines 410, 540, 640, 770 and 747. Alternatively, it may be that a single credentialing device 100 possessed and operated by a single entity generates and provides all of these security credentials. It should also be noted that, although the above examples specifically discuss the use of matching keys as security credentials, any of a variety of other types of security credentials (e.g., hashes, hash values, certificates, seeds for random number generation, etc.) meant for use with any of a variety of types of authentication techniques may be employed in various embodiments.

Turning again more specifically to FIG. 2A, copies of the security microcode 410 along with the security credentials 245a may be provided to the processor component 450 or 550 through a provisioning device 102. This particular provisioning device 102 may be incorporated into the operation of a manufacturing facility in which the processor component 450 and/or 550 is fabricated. More specifically, a copy of the security microcode 410 along with the security credentials 245a may be incorporated into the processor component 450 or 550 before the processor component 450 or 550 is incorporated into the processing device 500. By way of example, this particular provisioning device 102 may be electrically coupled to one or more pins carried on a package casing in which the semiconductor die of the processor component 450 or 550 is contained to provide the security microcode 410 along with the security credentials 245a thereto before attachment of the processor component 450 or 550 to a circuitboard of the processing device 500.

Returning to FIGS. 1A and 1B, the processor component 450 or 550 may be initialized as a result of a powering on of the processing device 500 (e.g., as a result of the commencement of provision of electric power to the processing device 500) and/or as a result of a resetting of the processing device 500 triggered either by hardware-based logic or by software. In response to such initialization, the processor component 450 or 550 may execute the security microcode 410 in a pre-OS operating environment to begin forming the chain of trust that may form an initial portion of the chain of trust between the security microcode 410 and the verification routine 540, and then subsequently extended through the firmware 640 and the OS 770, and then to the OS security routine 747.

In various embodiments, the security server 300 may incorporate a processor component 350, a storage 360 and/or a network interface 390 to couple the security server 300 to the network 999. The storage 360 may store a reference data 330 and/or a security routine 340. The security routine 340 may incorporate a sequence of instructions operative on the processor component 350 to implement logic to perform various functions. As will be explained in greater detail, the processor component 350 may be caused by its execution of at least the security routine 340 to cooperate with the performance of recurring checks of the integrity of the OS security routine 747 by the processor component 450 or 550 as a result of executing at least the device security routine 647. More specifically, aspects of such recurring checks that are more demanding of processing and/or storage resources may be performed by the processor component 350 of the security server 300 instead of the processor component 450 or 550 of the processing device doing so.

Figure 3A:
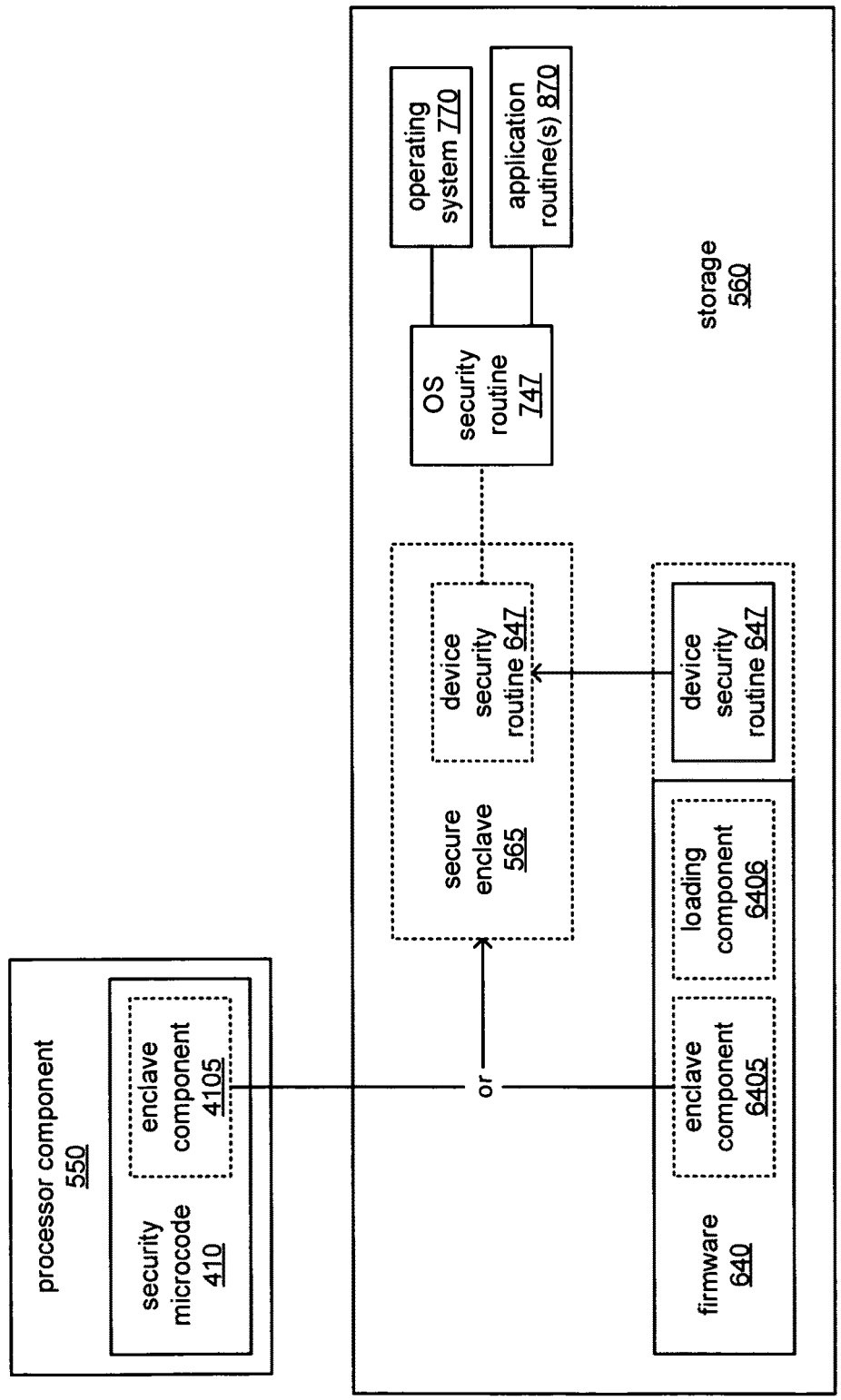
FIGS. 3A and 3B each illustrate an example embodiment of providing at least one isolated operating environment.
Figure 3B:
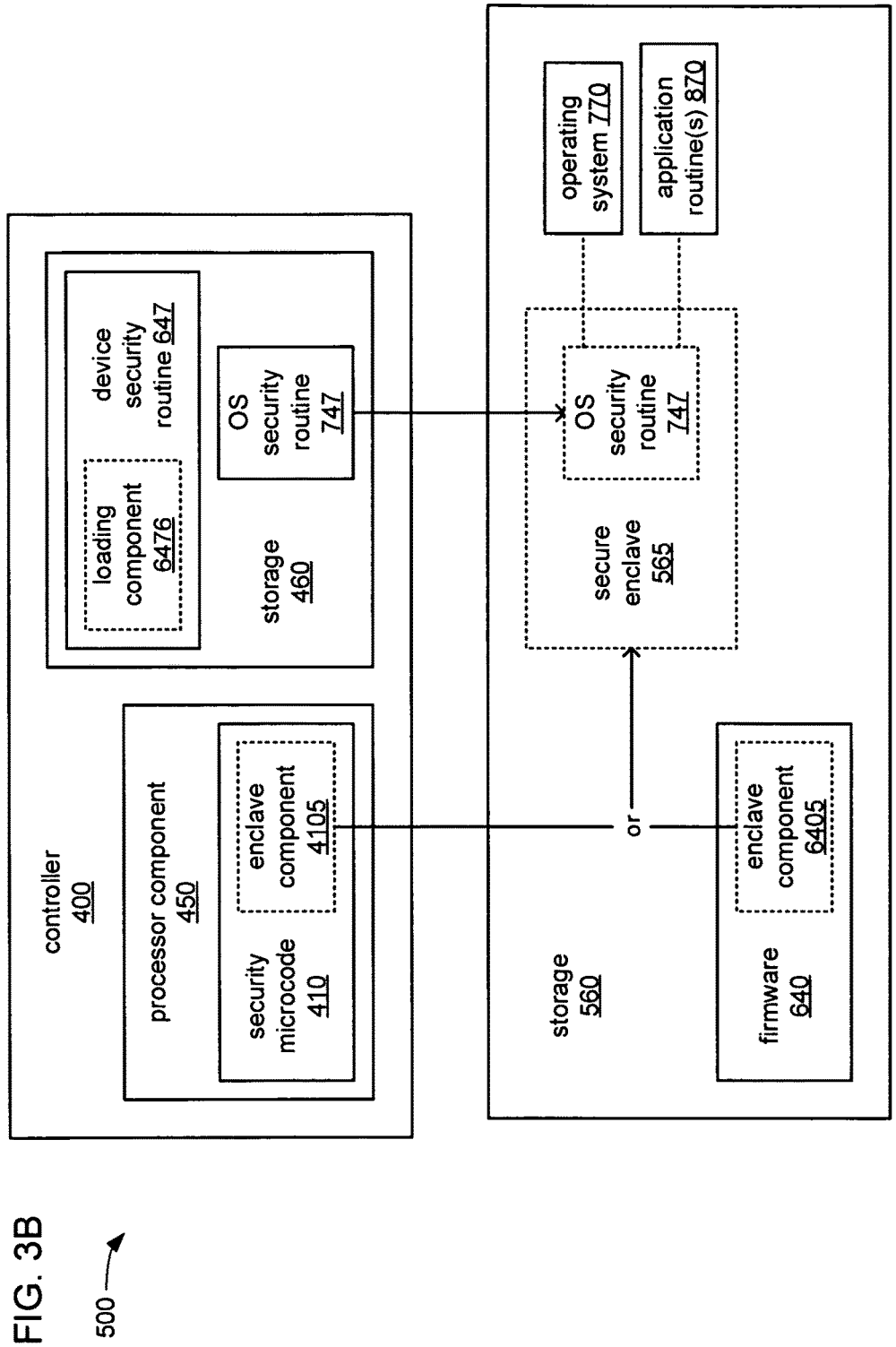

FIGS. 3A and 3B, together, depict aspects of placing at least the device security routine 647 within a protected operating environment to maintain its integrity against malicious software that may be executed within the operating environment of the OS 770 while the device security routine 647 recurringly checks the integrity of the OS security routine 747. More specifically, FIG. 3A illustrates aspects of the generation of the secure enclave 565 with the device security routine 647 maintained therein to maintain its integrity while executed by the processor component 550, and FIG. 3B illustrates aspects of maintaining the device security routine 647 within the isolated operating environment of the controller 400.

Turning to FIG. 3A, as depicted, the security microcode 410 may include an enclave component 4105 such that execution of the security microcode 410 by the processor component 550 may entail execution of the enclave component 4105. Alternatively, and as also depicted, the firmware 640 may include an enclave component 6405 such that execution of the firmware 640 by the processor component 550 may entail execution of the enclave component 6405. As part of initializing the processing device 500 to prepare it for executing the OS 770 and/or the one or more application routines 870, either the enclave component 4105 or 6405 may generate the secure enclave 565. If it is the enclave component 6405 that does so, then it may do so after the firmware 640 has been successfully authenticated such that the chain of trust that may start with the security microcode 410 may have been extended to include at least the firmware 640. In this way, the firmware 640 (and accordingly, the enclave component 6405) is deemed to be trusted before the enclave component 6405 is relied upon to generate the secure enclave 565.

Continuing with FIG. 3A, as also depicted, the firmware 640 may include a loading component 6406 such that execution of the firmware 640 by the processor component 550 may entail execution of the loading component 6406. Regardless of the manner in which the secure enclave 565 is generated, the loading component 6406 may load the device security routine 647 into the secure enclave 565. As depicted, in some embodiments, the device security routine 647 may be part of the firmware 640. As with the enclave component 6405, the loading component 6406 may delay the loading of the device security routine 647 (regardless of whether the device security routine 647 is part of the firmware 640, or not) into the secure enclave 565 until after the firmware 640 has been authenticated.

With the device security routine 647 loaded into the secure enclave 565, the device security routine 647 is maintained within an operating environment that is isolated to at least some degree from the operating environment of the OS 770 such that the device security routine 647 may continue to be deemed to be trusted long after the chain of trust extending from the security microcode 410 and to at least the firmware 640 has been formed. Based on this ongoing trusted status, the device security routine 647 may be relied upon to recurringly check the integrity of the OS security routine 747 by recurringly challenging the OS security routine 747 to provide measures of itself. In this way, the OS security routine 747, despite being executed in the very same operating environment of the OS 770, may continue to be trustworthy enough to recurringly check the integrity of at least a portion of the OS 770 and/or of the one or more application routines 870.

The protection afforded to the device security routine 647 by the secure enclave 565 may be based on any of a variety of features of the processor component 450 and/or 550. By way of example, the processor component 550 may be configurable by the security microcode 410 and/or the firmware 640 to allocate one or more ranges of addresses employed in accessing different storage locations within the storage 560 as being subject to differing access restrictions that allow some executable routines to access such an allocated range of addresses, but not other executable routines. Thus, for example, the security microcode 410 and/or the firmware 640 may cause the processor component 550 to respond to an attempt by an unauthorized executable routine by at least blocking that attempt, and may further jump to executing a portion of the security microcode 410 and/or the firmware 640 (e.g., the enclave component 4105 or 6405, respectively) to issue or process a software interrupt, trigger or process an exception, etc.

Turning to FIG. 3B, as was depicted in FIG. 3A, the security microcode 410 may include an enclave component 4105 or the firmware 640 may include an enclave component 6405, and as part of initializing the processing device 500 to prepare it for executing the OS 770 and/or one or more of the application routines 870, either the enclave component 4105 or 6405 may generate the secure enclave 565. If it is the enclave component 6405 that does so, then it may do so after the firmware 640 has been successfully authenticated such that the chain of trust that may start with the security microcode 410 extends to include at least the firmware 640. In this way, the firmware 640 (and accordingly, the enclave component 6405) is deemed to be trusted before the enclave component 6405 is relied upon to generate the secure enclave 565.

Differing from what was depicted in FIG. 3A, as depicted in FIG. 3B, the device security routine 647 may be maintained within the storage 460 of the controller 400, instead of being maintained within the storage 560 (whether in a secure enclave, or not). As a result, and as also depicted, the firmware 640 may not incorporate the device security routine 647 as a portion of the firmware 640. Thus, the manner in which the device security routine 647 may be deemed to be trusted may be based on its storage and execution within the isolated operating environment of the controller 400, rather than based on being authenticated as part of the firmware 640. Regardless of the exact manner in which the device security routine 647 is caused to be deemed to be trusted, as depicted in FIG. 3B, the device security routine 647 may include a loading component 6476 that may load the OS security routine 747 into the secure enclave 565. As further depicted, in some embodiments, a copy of the OS security routine 747 may be stored within the storage 460 of the controller 400 along with the device security routine 647.

The loading of the OS security routine 747 into the secure enclave 565 may be an additional measure to provide ongoing protection of the integrity of the OS security routine 747 by isolating the OS security routine 747 to at least some degree from the operating environment of the OS 770 as the OS security routine 747 recurringly checks the integrity of at least a portion of the OS 770 and/or of the one or more application routines 870. As a result of being maintained in the more thoroughly isolated operating environment of the controller 400, the device security routine 647 may be deemed to have a greater degree of ongoing trust than the OS security routine 747 within the secure enclave 565 such that the device security routine 647 is again relied upon to recurringly check the integrity of the OS security routine 747 by recurringly challenging the OS security routine 747 to provide measures of itself.

Figure 4:
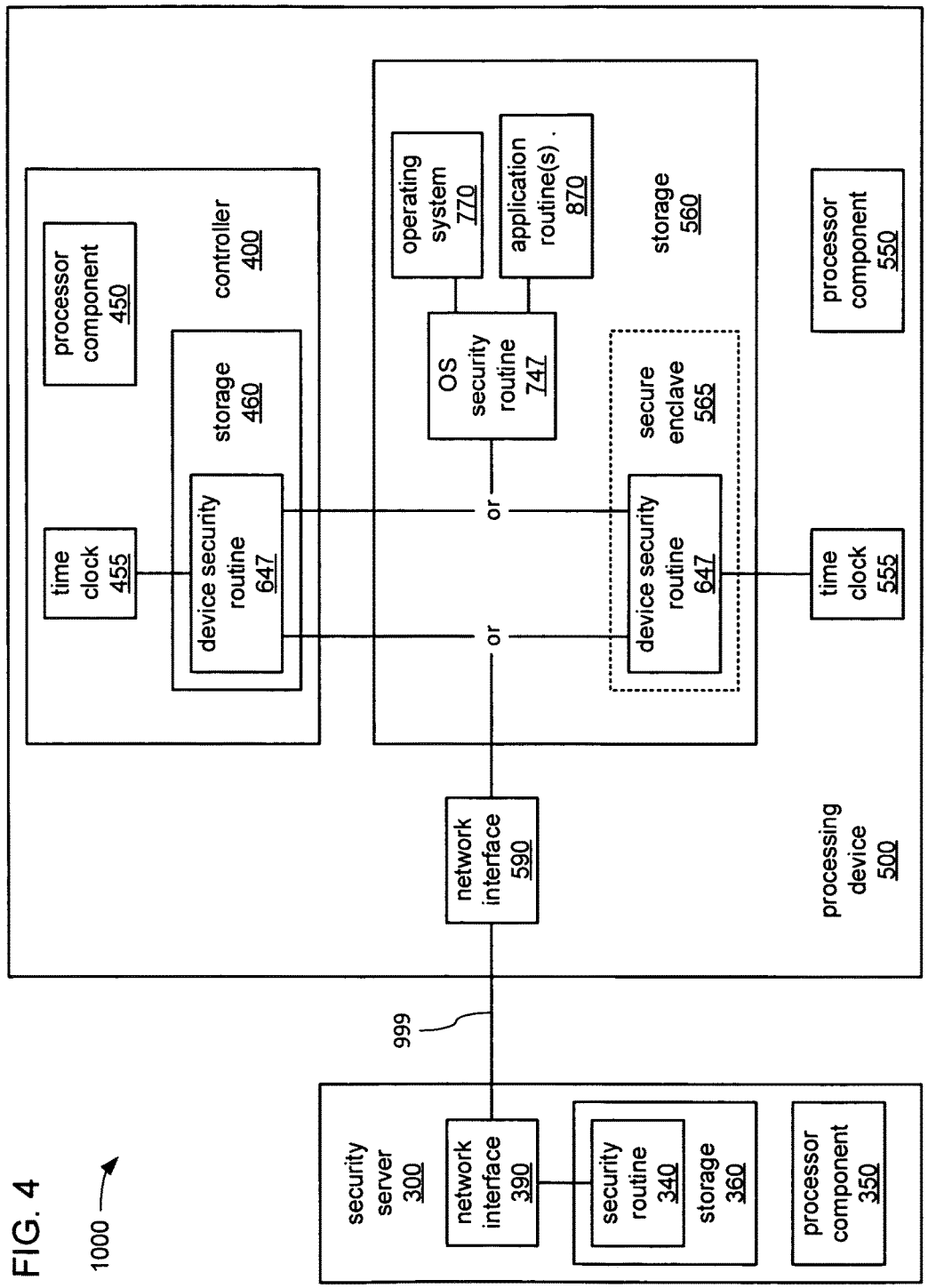
FIG. 4 illustrates an example embodiment of dual level integrity checking.

FIG. 4 depicts aspects of these dual levels of recurring checking performed by the device security routine 647 and by the OS security routine 747 in greater detail. Again, as the OS security routine 747 recurringly checks the integrity of at least a portion of the OS 770 and/or of one or more of the application routines 870, the device security routine 647 recurringly checks the integrity of the OS security routine 747. As depicted, the device security routine 647 may perform such checks of the integrity of the OS security routine 747 while having its own integrity protected to at least some degree by being stored and executed within an operating environment that is isolated to at least some degree from the operating environment of the OS 770, such as either the operating environment provided by the controller 400 or the operating environment within the secure enclave 565. Through such isolation from the operating environment of the OS 770, the device security routine 647 is provided with at least some degree of protection from malicious software that may be executed within the operating environment of the OS 770. In this way, the device security routine 647 may continue to be deemed trustworthy on an ongoing basis as the OS 770 and/or one or more of the application routines 870 continue to be executed.

As will be explained in greater detail, the device security routine 647 may recurringly check the integrity of the OS security routine 747 by recurringly challenging the OS security routine 747 to take measures of at least a portion of itself and to provide those measures to the device security routine 647 in responses to those challenges. The device security routine 647 may analyze both the measures and the amount of time that elapses between the sending of each challenge to the OS security routine 747 and the receipt of a response thereto to determine whether the integrity of the OS security routine 747 is compromised such that its determinations of the integrity of the OS 770 and/or of one or more of the application routines 870 are able to be trusted. Depending on whether the device security routine 647 is maintained within the isolated operating environment of the controller 400 or the isolated operating environment of the secure enclave 565, the device security routine 647 may employ either the time clock 455 of the controller 400 or the time clock 555 external to the controller 400 to determine such elapsing amounts of time.

As will also be explained in greater detail, in various embodiments, the device security routine 647 and the security routine 340 of the security server 300 may cooperate in various ways in analyzing the measures provided by the OS security routine 747 and/or the amounts of time that elapse between the sending of each challenge to the OS security routine 747 and the receipt of an associated response thereto. In some embodiments, the device security routine 647 may perform such analysis and provide an indication of the results thereof to the security routine 340, which may analyze the results of such analyses received over an extended period of time and/or from the device security routines 647 of multiple processing devices 500. Where the device security routine 647 performs that analysis, the derivation of expected measures to use in comparisons to the measures provided by the OS security routine 747 may be performed by the device security routine 647, or may be performed within the security server 300 by the security routine 340 and transmitted to the device security routine 647. In other embodiments where it is the security routine 340 that performs that analysis, the device security routine 647 may relay the measures received from the OS security routine 747 along with indications of the amount of time elapsing between the sending of each challenge to the OS security routine 747 and the receipt of an associated response thereto.

Figure 5A:
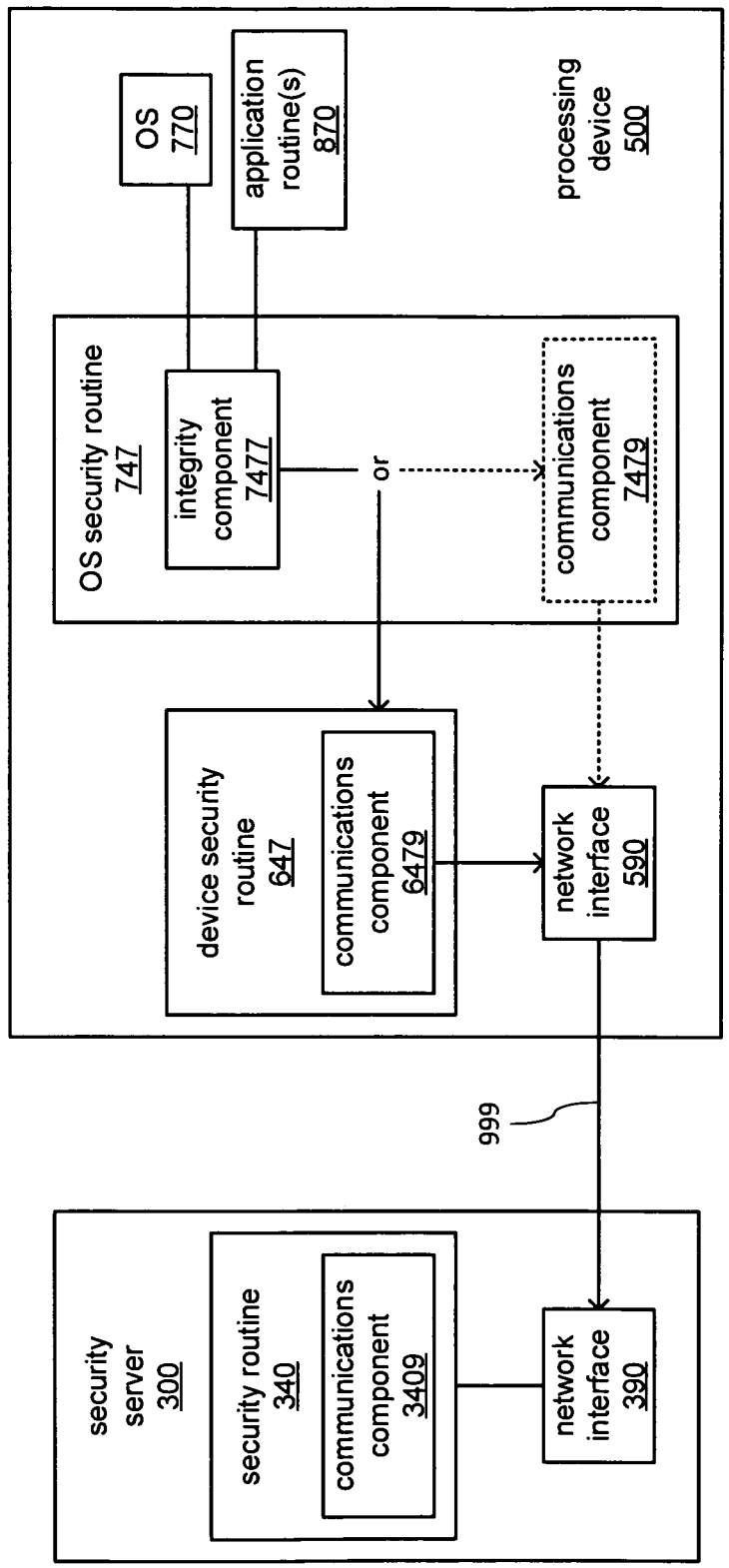
FIGS. 5A, 5B and 5C, together, portions of the example embodiment of dual level integrity checking of FIG. 4.
Figure 5B:
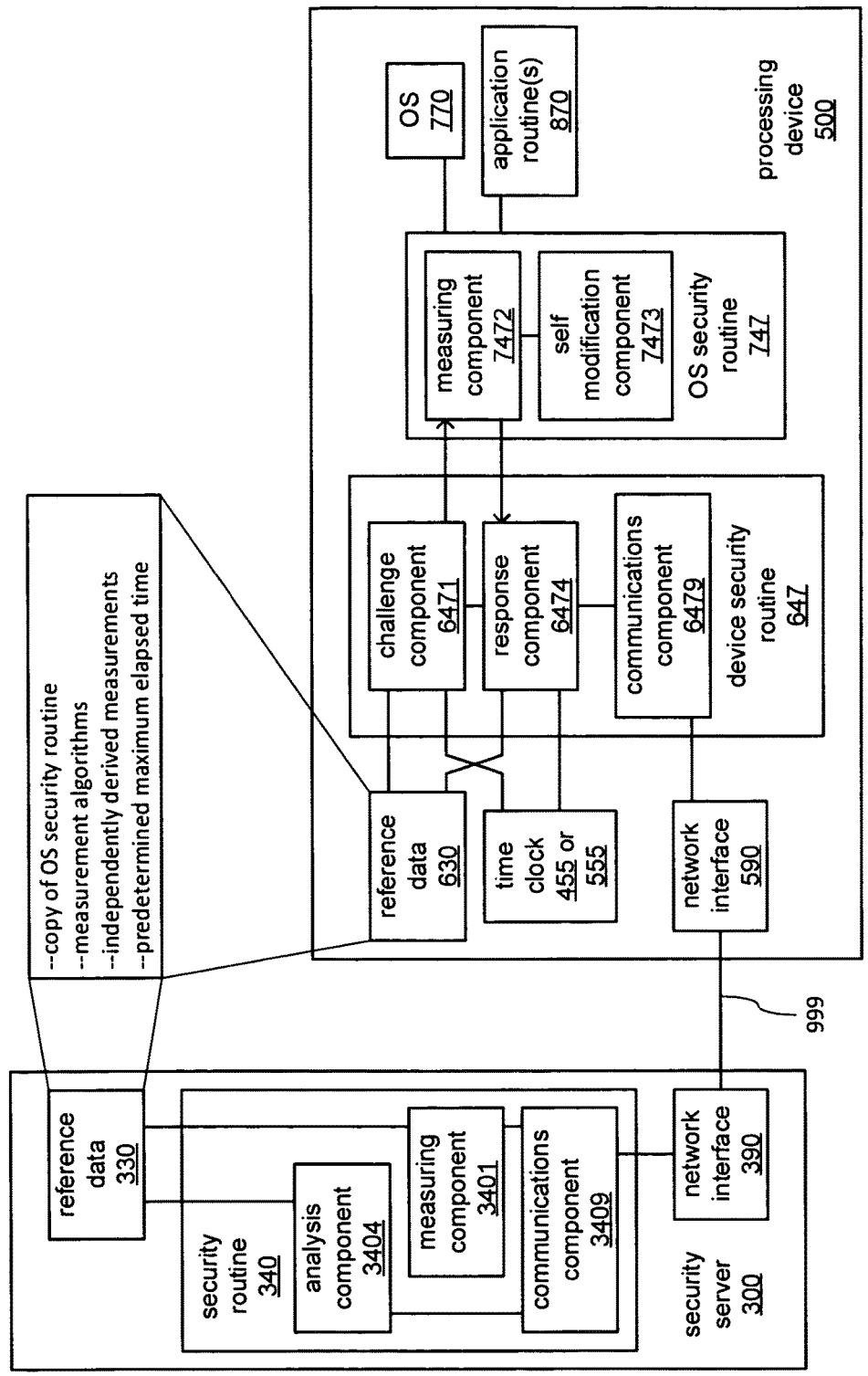
Figure 5C:
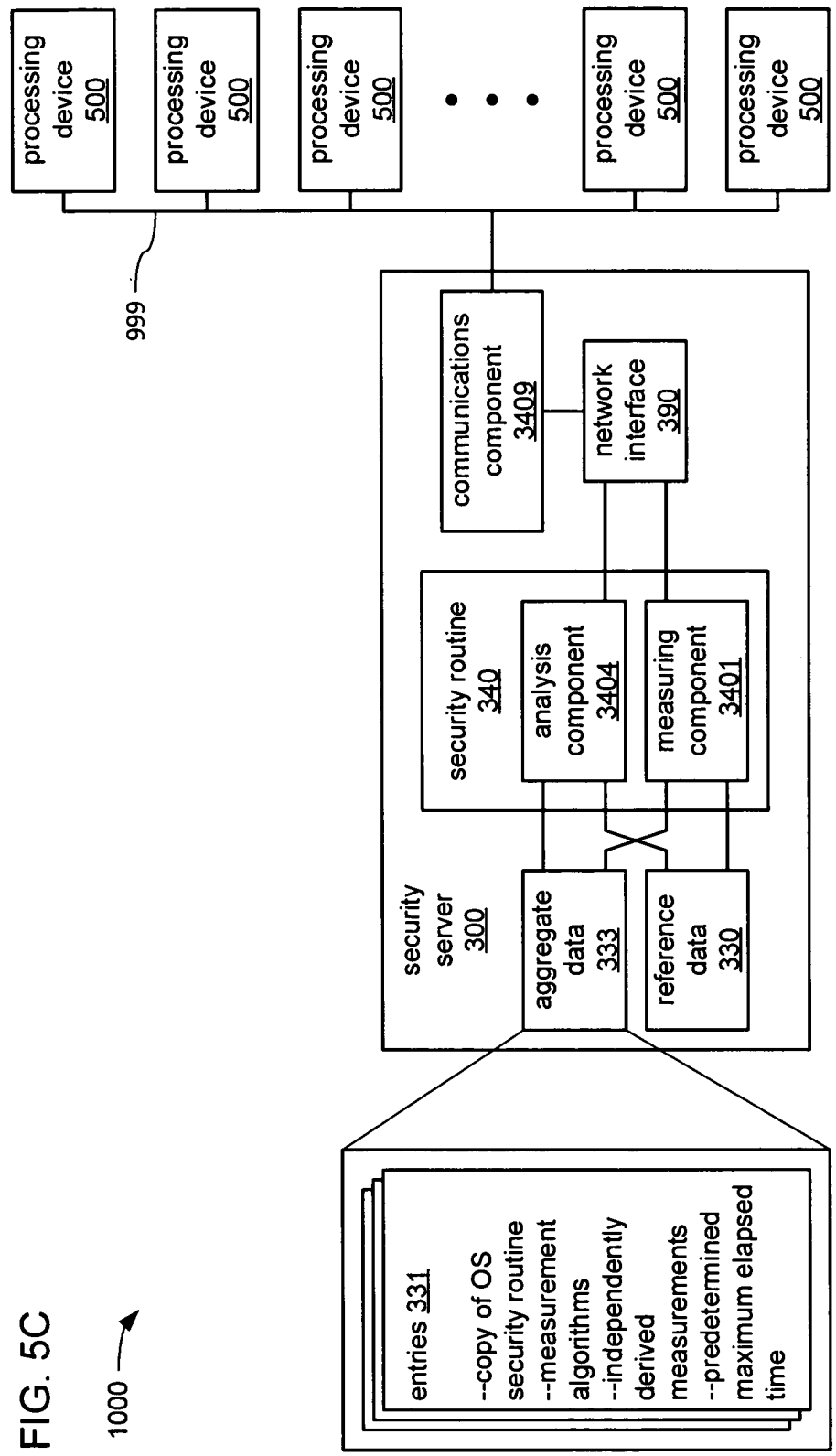

FIGS. 5A, 5B and 5C, together, depict aspects of the dual levels of recurring checking performed by the device security routine 647 and by the OS security routine 747 in still greater detail. FIG. 5A illustrates aspects of the integrity checking of the OS 770 and/or of one or more of the application routines 870 by the OS security routine 747 along with responding to its results, FIG. 5B illustrates aspects of the integrity checking of the OS security routine 747 by the device security routine 647 along with responding to its results, and FIG. 5C illustrates aspects of overseeing and aggregating the results of such integrity checking carried out within multiple ones of the processing device 500.

Turning to FIG. 5A, as depicted, one or more of the security routine 340, the device security routine 647 and OS security routine 747 may include a communications component 3409, 6479 and 7409, respectively, that may be executable by corresponding ones of the processor components 350, 450 and/or 550 to operate corresponding ones of the network interfaces 390 and 590 to transmit and receive signals via the network 999 as has been described. Among those signals may be signals conveying measures of the OS security routine 747 taken by the OS security routine 747 itself, expected measures of the OS security routine 747 derived independently of the OS security routine 747, indications of amounts of time elapsing between challenges sent to the OS security routine 747 and receipt of associated results, as well as results of checking the integrity of the OS security routine 747, the OS 770 and/or of one or more of the application routines 880. Such signals may be exchanged at least between the security server 300 and the processing device 500, but may also be exchanged between the security server 300 and multiple ones of the processing device 500, as will be explained in greater detail. As will be recognized by those skilled in the art, each of these communications components is selected to be operable with whatever type of interface technology is selected to implement corresponding ones of the network interfaces 390 or 590.

As also depicted, the OS security routine 747 may include an integrity component 7477 executable by the processor component 550 to recurringly check the integrity of at least a portion of the operating system 770 and/or of one or more of the application routines 870. The integrity component 7477 may employ any of a variety of approaches to making such recurring checks. In some embodiments, the integrity component 7477 may recurringly take a measure of one or more of the components of the OS 770 and/or of one or more of the application routines 870, such as a hash value or checksum, and may then analyze or compare that measure to an expected value to determine whether the integrity of the OS 770 and/or of one or more of the application routines 870 has been compromised. Alternatively or additionally, the integrity component 7477 may recurringly scan portions of the OS 770 and/or of one or more of the application routines 870 for particular sets of instructions and/or one or more other known signatures associated with having been compromised by malicious software (e.g., a virus or worm).

In some embodiments, the OS security routine 747 may incorporated into the OS 770 or otherwise accompany the OS 770 as a loader of executable portions of the OS 770 and/or of one or more application routines 870. As a result of the OS security routine 747 serving as a loader of the OS 770, the integrity component 7477 may be afforded an opportunity to analyze the instructions of executable portions of the OS 770 and/or of the one or more application routines 870 just before they are to be executed in the operating environment of the OS 770. In so doing, the integrity component 7477 may, prior to normal execution of instructions in the operating environment of the OS 770, effect a form of preview execution of those instructions under controlled conditions to enable instruction behavior to be observed and analyzed with minimal risk of any malicious actions being successfully carried out.

Regardless of the exact manner in which the integrity component 7477 recurringly checks the integrity of at least a portion of the OS 770 and/or of one or more of the application routines 870, the integrity component 7477 may provide indications of the results to one or both of the device security routine 647 and the security routine 340 within the security server 300. In some embodiments, the OS security routine 747 may provide the results of those checks by the integrity component 7477 to the device security routine 647 through whatever form of communications channel may be permitted between the isolated operating environment in which the device security routine 647 is maintained (e.g., within the secure enclave 565 or within the controller 400 as depicted in FIG. 4) and the operating environment(s) outside that isolated environment, such as the operating environment of the OS 770. In some of such embodiments, the device security routine 647 may take any of a variety of actions in response to an indication by the OS security routine 747 that either the OS 770 or one of the application routines 870 has been compromised. By way of example, the device security routine 647 may cause a reinitialization of the processing device 500 to clear volatile portions of the storage 560 and reboot the OS 770 in an effort to purge any malicious routines. Alternatively or additionally, the communications component 6479 may operate the network interface 590 to disconnect the processing device 500 from the network 999 to at least limit the malicious actions that may be taken by a now compromised OS 770 or compromised application routine 870 to within the processing device 500. Also alternatively or additionally, the communications component 6479 may operate the network interface 590 to relay the indication of corruption received from the OS security routine 747 to the security server 300 to thereby enable the security server 300 to take any of a variety of actions, including and not limited to transmitting commands to other devices (not shown) that are coupled to the network 999 to cease communicating with the processing device 500.

In other embodiments in which the OS security routine 747 incorporates the communications component 7479, the integrity component 7477 may cooperate with the communications component 7479 to operate the network interface 590 to provide indications of the results of the recurring checks of integrity of the OS 770 and/or of one or more of the application routines 870 directly to the security server 300. Again, the security server 300 may respond to an indication of the integrity of the OS 770 and/or of one of the application routines 870 having been compromised by taking any of a variety of actions.

Turning to FIG. 5B, as depicted, the device security routine 647 may include a challenge component 6471 executable by the processor component 450 or 550 to recurringly check the integrity of the OS security routine 747 by recurring sending it a challenge. In some embodiments, the challenge component 6471 may use indications from the time clock 455 or 555 of the current time or of the amount of time since the last challenge was sent to send challenges to the OS security routine 747 at intervals of random duration so as to prevent the timing of such challenges from becoming predictable to malicious routines. Each such challenge may be made up of a command directed at the OS security routine 747 for it take a measure of at least a portion of itself. In some embodiments, that command may include an indication of what type of measure is to be taken, and the challenge component 6471 may randomly select the type of measure to be so specified in each challenge from a selection of measuring algorithms stored in the reference data 630. Such a selection of measuring algorithms may include one or more types of hash algorithms (e.g., one or more of the SHA-0 through SHA-3 algorithms), one or more types of checksum, etc.

As depicted, the OS security routine 747 may include a measuring component 7472 executable by the processor component 550 to take a measure of at least a portion of the OS security routine 747 in response to the receipt of a challenge from the challenge component 6471 of the device security routine 647. In embodiments in which the type of measure to be taken may vary and may be specified by the challenge component 6471 in the challenge, the measuring component 7472 may include executable instructions implementing all of the different types of measures that may be so specified by the challenge component 6471. Regardless of whether the type of measure to be taken by the measuring component 7472 is so specified, or not, the measuring component 7472 may send a response to the challenge back to the device security routine 647 that includes an indication of the measure.

As also depicted, the OS security routine 747 may include a self modification component 7473 executable by the processor component 550 to modify at least a portion of the OS security routine 747 following the taking of a measure of at least a portion of the OS security routine 747. In some embodiments, the self modification component 7473 may move one or more sequences of executable instructions about within the OS security routine 747 and/or make other modifications to portions of OS security routine 747 that are selected to change the value of a subsequent measure that may be taken of the OS security routine 747. In such embodiments, the manner in which at least a portion of the OS security routine 747 is modified may be selected to cause the resulting change in value of a subsequent measure taken of the OS security routine 747 to be predictable such that it can be independently derived by the device security routine 647 and/or the security routine 340.

By way of example, it may be that the OS security routine 747 receives an initial challenge to take and provide an initial measure of at least a portion of itself from the challenge component 6471 during initialization of the processing device 500, and before the OS security routine 747 begins recurringly checking of the integrity of at least a portion of the OS 770 and/or of one or more of the application routines 870. In response, the measuring component 7472 may take such an initial measure of at least a portion of the OS security routine 747 at a time before the OS security routine 747 begins its recurring checks, and then the measuring component 7472 may send a response back to the device security routine 647 that includes an indication of the initial measure. Where the initial challenge includes a command that specifies the type, the measuring component 7472 may take that specified type of measure as the initial measure. Following the taking of the initial measure and the sending of it to the device security routine 647, the self modification component 7473 may then modify the OS security routine 747 such that the value of the next measure that may be taken of at least a portion of the OS security routine 747 will be changed to a different value than what it would have been if the OS security routine 747 had not been so modified. As a result, if a subsequent measure of the same type as the initial measure is taken, the value of that subsequent measure would differ from the value of the initial measure.

As further depicted, the device security routine 647 may include a response component 6474 executable by the processor component 450 or 550 to at least receive the responses from the measuring component 7472 of the OS security routine 747 conveying the measures taken by the measuring component 7472 in response to the challenges sent thereto by the challenge component 6471. As previously discussed, measures received in those responses and/or amounts of elapsed time between the sending of each challenge and the receipt of associated responses may be analyzed within the processing device 500 in some embodiments, while such analyses may be performed within the security server 300 in other embodiments.

In embodiments in which measures received in response to challenges are to be analyzed within the processing device 500, the response component 6474 may compare each received measure to a corresponding expected measure of the OS security routine 747 derived independently from any portion of the OS security routine 747, including the measuring component 7472. In such embodiments, it may be the challenge component 6471 that derives an expected measure of the OS security routine 747 that corresponds to a challenge sent by the challenge component 6471 to the measuring component 7472. The challenge component 6471 may store that expected measure within the reference data 630 for the response component 6474 to use in a comparison to the measure received in the response to that challenge received from the measuring component 7472. If the measure received in that response from the measuring component 7472 does not match the expected measure that was independently derived by the challenge component 6471, then the response component 6474 may determine that the integrity of the OS security routine 747 is compromised.

Such independent derivation of expected measures by the challenge component 6471 may entail the challenge component 6471 accessing at least a portion of a copy of the OS security routine 747 maintained as part of the reference data 630 and taking a measure thereof as the measuring component 7472 would. In embodiments in which the OS security routine 747 may be modified by the self modification component 7473 thereof, the challenge component 6471 may similarly modify the copy of the OS security routine 747 maintained as part of the reference data 630. Thus, in effect, the challenge component 6471 may perform the same actions on the copy of the OS security routine 747 maintained as part of the reference data 630 as the measuring component 7472 and the self modification component 7473 perform on the OS security routine 747.

In embodiments in which the amount of time that elapses between the sending of challenge by the challenge component 6471 and the receipt by the response component 6474 of an associated response that conveys an associated measure is to be analyzed within the processing device 500, the response component 6474 may compare each such elapsed amount of time to a predetermined maximum elapsed time that is expected to be required. Such a predetermined maximum elapsed time may be determined experimentally for the processing device 500, in particular, or for a set of processing devices that includes the processing device 500 or that includes one or more processing devices deemed to be representative of the processing device 500. In some embodiments, such experimentation may entail testing of observed typical combinations of tasks that may be expected to be underway, and thereby consuming at least some of the processing resources of the processor component 550, at the time a challenge is sent in an effort to allow for a portion of elapsed time caused by other competing tasks. Alternatively or additionally, the OS 770 may be configured to assign the highest priority (or one of the highest priorities) to the handling by the OS security routine 747 of the challenges sent by the challenge component 6471, such that processing resources may be reassigned from other tasks and to the handling of the challenges on occasions where there is competition thereamong for processing resources of the processor component 550.

Upon sending a challenge to the measuring component 7472 of the OS security routine 747, the challenge component 6471 may refer to the current time maintained by the time clock 455 or 555, and may convey an indication of when that challenge was sent to the response component 6474 (e.g., a timestamp thereof). Then, upon receiving a response to that challenge conveying what is at least indicated to be a measure taken by the measuring component 7472 of at least a portion of the OS security routine 747, the response component 6474 may refer to the current time maintained by the time clock 455 or 555, and may first compare the time at which the response was received to the time at which the challenge had been sent to derive the elapsed time therebetween. The response component 6474 may then compare that elapsed time to the predetermined maximum elapsed time, and if the elapsed time exceeds the predetermined maximum elapsed time, then the response component 6474 may determine that the integrity of the OS security routine 747 is compromised. However, if the measure conveyed in that response from the measuring component 7472 matches the expected measure independently derived by the challenge component 6471, and if the elapsed time does not exceed the predetermined maximum elapsed time, then the response component 6474 may determine that the integrity of the OS security routine 747 is not compromised.

Such an analysis of the elapsed time may be based on one or more presumptions. One of such presumptions may be that compromising the integrity of the OS security routine 747 necessarily involves altering it such that any measure taken of the OS security routine 747 will not have an expected value such that a measure allowed by malicious software to be taken by the measuring component 7472 will not longer result in a value of the measure that will match the corresponding expected measure that is independently derived by challenge component 6471. Another of such presumptions may be that the inability of the measuring component 7472 to provide such expected values in its measures makes it necessary for the malicious routine will itself need to determine what the value of a measure taken by the measuring component 7472 would have been if the integrity of the OS security routine 747 were not compromised. Still another of such presumptions may be that such a malicious routine will require more time to so determine what the value of a measure taken by the measuring component 7472 would have been had the malicious routine not brought about the compromising of the integrity of the OS security routine 747 than the time required by the measuring component 7472 to take a measure. Thus, it may be presumed that such a difference in time will be reflected in the elapsed time between when a challenge is sent and a response to that challenge is received, and that difference will be detectable by a comparison to a predetermined maximum period of time selected to separate elapsed times associated with the measuring component 7472 taking a measure while the OS security routine 747 is not compromised from elapsed times associated with a malicious routine deriving the measure that the measuring component 7472 would have taken while the OS security routine 747 is compromised.

As has been discussed, the processing and/or storage resources available to execute the device security routine 647 may be somewhat limited, especially where the device security routine 647 is maintained within the controller 400. Thus, it may be that a copy of the OS security routine 747 is maintained as part of the reference data 330 within the storage 360 of the security server 300, and/or it may be that independent derivation of expected measures to use in comparisons to measures received from the measuring component 7472 is performed by the processor component 350 of the security server 300. More specifically, and as depicted, the security routine 340 of the security server 300 may include a measuring component 3401 executable by the processor component 350 to derive an expected measure of the OS security routine 747 that corresponds to a challenge sent by the challenge component 6471 to the measuring component 7472. The measuring component 3401 may then cooperate with the communications component 3409 to operate the network interface 390 transmit the expected measure to the processing device 500 where the response component 6474 may cooperate with the communications component 6479 to receive the expected measure to enable the response component 6474 to use it in a comparison to the measure received in the response to that challenge received from the measuring component 7472. As part of deriving that expected measure, the measuring component 3401 may also access at least a portion of a copy of the OS security routine 747 maintained as part of the reference data 330 and take a measure thereof as the measuring component 7472 would. Also, as part of deriving that expected measure, the measuring component 3401 may modify the copy of the OS security routine 747 maintained as part of the reference data 630 in same manner in which the self modification component 7473 thereof.

As still further depicted, the security routine 340 may incorporate an analysis component 3404 executable by the processor component 350 to perform the aforedescribed analyses performed by the response component 6474 of the measures received in responses from the measuring component 7472 and/or of the elapsed times, instead of the response component 6474 doing so. Thus, instead of analyzing such received measures, the response component 6474 may cooperate with the communications component 6479 to operate the network interface 590 to transmit those measures to the security server 300, where the analysis component 3404 may cooperate with the communications component 3409 to receive those measures to enable the analysis component 3404 to analyze those measures. The response component 6474 may also so cooperate with the communications component 6479 to similarly transmit to the security server 300 indications of when each of the challenges are sent to the measuring component 7472 and when each of the associated responses are received therefrom by the response component 6474. The analysis component 3404 may cooperate with the communications component 3409 to receive those indications and to use those indications to derive elapsed times. Alternatively, the response component 6474 may derive the elapsed times as previously described and may then cooperate with the communications component 6479 to transmit indications of those elapsed times to the security server 300.

Turning to FIG. 5C, as depicted, the security server 300 may be in communication with multiple ones of the processing devices 500 concerning checking the integrity of at least the OS security routine 747 within each. In embodiments in which different ones of the processing devices 500 may have different configurations of hardware and/or software components, the reference data 330 may be made up of multiple entries 331 that may each correspond to a different one of such configurations and/or may correspond to a different one of the depicted processing devices 500. In this way, different versions of the OS security routine 747 among the different depicted processing devices 500 may be accommodated along with different measuring algorithms, different independently derived expected measures, and/or different predetermined maximum elapsed times. Thus, in embodiments in which the measuring component 3401 generates expected measures for more than one of the processing devices 500, the measuring component 3401 may access information associated with a particular one of the depicted processing devices 500 by accessing a particular one of the entries 331 associated with the processing device 500.

Regardless of whether the device security routine 647 within each of the one or more of the depicted processing devices 500 relies on the security routine 340 to perform derivation of expected measures, analyses of measures or analyses of elapsed times, each of the depicted processing devices 500 may transmit indications of results of recurring checks of at least the OS security routine 747 within each to the security server 300. Each of the depicted processing devices 500 may also transmit indications of results of the recurring checks made by the OS security routine 747 of at least a portion of the OS 770 and/or of one or more of the application routines 870 within each of the depicted processing devices 500. The analysis component 3404 may cooperate with the communications component 3409 to receive these various results from each of the depicted processing devices 500 to enable the analysis component 3404 to identify patterns and/or other aspects of the manner in which one or more of the processing devices 500 may affected by malicious routines. The analysis component 3404 more store indications of identified trends or patterns associated with attacks by malicious routines among multiple ones of the depicted processing devices 500 as part of an aggregate data 333 for subsequent analysis.

In various embodiments, the processor components 350, 450 and/or 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storages 360, 460 and/or 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the network interfaces 390 and/or 590 may employ any of a wide variety of signaling technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
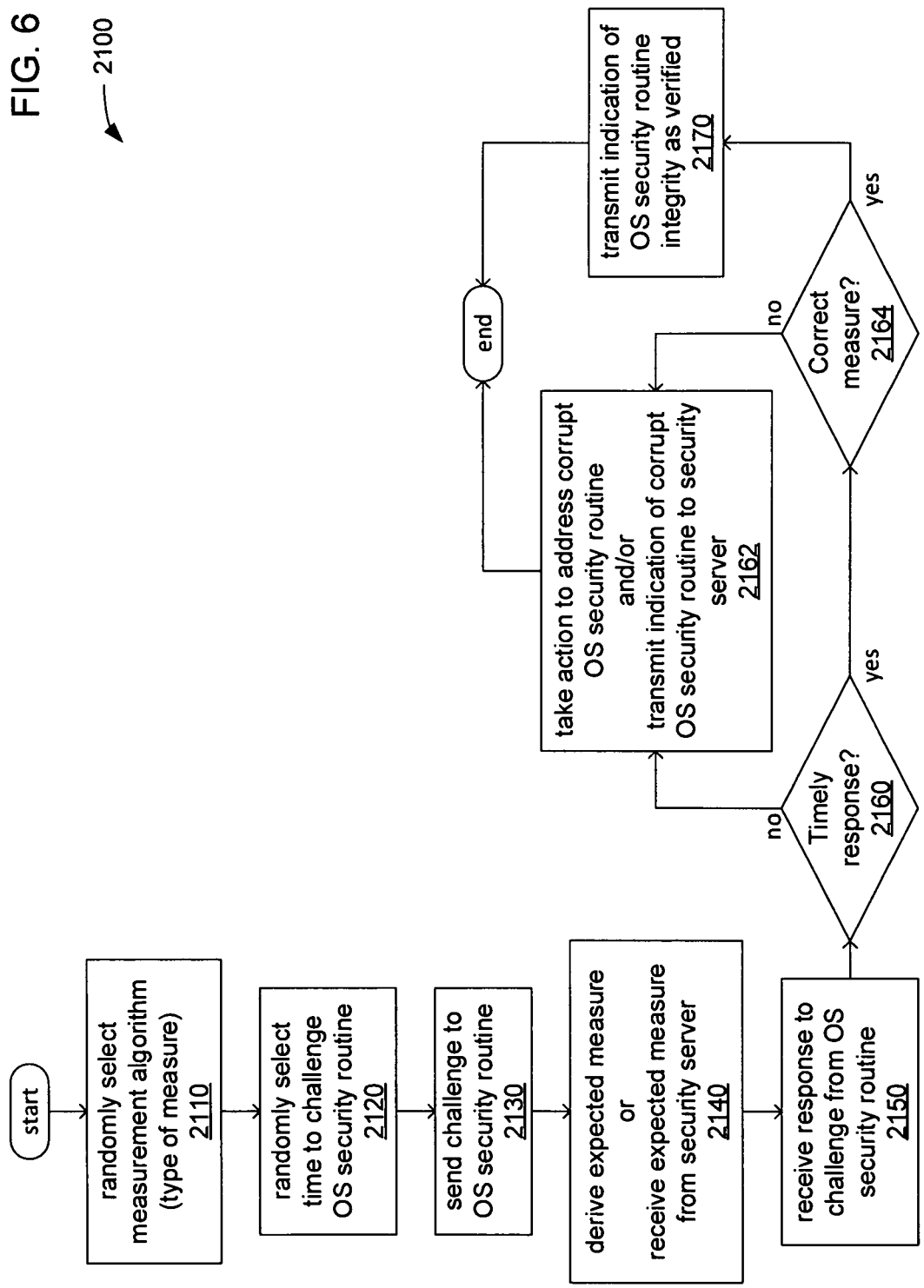
FIG. 6 illustrates a logic flow according to an embodiment.

FIG. 6 illustrates an embodiment of a logic flow 2100. The logic flow 2100 may be representative of some or all of the operations executed by one or more embodiments described herein. More specifically, the logic flow 2100 may illustrate operations performed by one of the processor components 450 and 550 in executing at least the device security routine 647, and/or performed by other component(s) of the processing device 500. In particular, the logic flow 2100 is focused on operations to recurringly check the integrity of the OS security routine 747.

At 2110, either a main processor component or a controller processor component of a processing device (e.g., one of the processor components 450 or 550 of the processing device 500) may randomly select a measuring algorithm that an OS security routine of the processing device (e.g., the OS security routine 747) is capable of using to take a measure of at least a portion of itself. As has been discussed with regard to embodiments in which different measuring algorithms to obtain different types of measures may specified via a challenge, any of a variety of measuring algorithms may be used, including and not limited to, various hash and/or checksum algorithms.

At 2120, the main processor component or the controller processor component may randomly select a time at which to send a challenge to the OS security routine. As has been explained, the OS security routine may be executed in an operating environment of an OS, and the processor component that sends the challenge may caused to do so by its execution of a device control routine within. another operating environment that is isolated to at least some degree from the operating environment of the OS (e.g., the device security routine 647 executed by the processor component 450 within the controller 400 or executed by the processor component 550 within the secure enclave 565). At 2130, the main processor component or the controller processor component may so send the challenge to the OS security routine at the randomly selected time, and specifying the randomly selected measuring algorithm.

At 2140, the main processor component or the controller processor component may either derive an expected measure of the OS security routine that corresponds to the challenge just sent or may receive such an expected measure from a security server (e.g., the security server 300). As previously discussed, the derivation of expected measures of at least a portion of the OS security routine may be offloaded to a security server where limited processing and/or storage resources are available to support the execution of the device security routine.

At 2150, a response to the challenge may be received from the OS security routine. As has been discussed, such a response may contain the measure commanded to be provided by the challenge.

At 2160, the main processor component or the controller processor component may check whether the response was timely. As has been discussed, the amount of time that has elapsed from when the challenge was sent to when the associated response was received may be compared to a predetermined maximum elapsed time. If the elapsed time does not exceed the predetermined maximum elapsed time, then the response is timely and may be taken as one indication that the integrity of the OS security routine has not been compromised. However, if the elapsed time does exceed the predetermined maximum elapsed time, then the response is not timely and may be taken as an indication that the integrity of the OS security routine has been compromised.

Thus, if the response is not timely at 2160, then the integrity of the OS security routine may be determined to be compromised such that the OS security routine has been corrupted. The main processor component or the controller processor component may directly take action to address the corruption of the OS security routine and/or may transmit an indication to the security server that the OS security routine has been determined to be corrupted at 2162.

However, if the response is timely at 2160, then a check may be made at 2164 as to whether the value of the measure received in the response from the OS security routine is correct. As has been explained, the correctness of the measure received from the OS security routine in response to a particular challenge may be determined by comparing that measure to the expected measure independently derived by the security server, or by the main processor component or the controller processor component. If the measure matches the independently derived expected measure, then the measure is correct, and may be taken as another indication that the integrity of the OS security routine has not been compromised. However, if the measure does not match the independently derived expected measure, then the measure is not correct, and may be taken as an indication that the integrity of the OS security routine has been compromised such that the OS security routine is corrupted.

Thus, if the measure received in the response from the OS security routine is not correct at 2164, then the integrity of the OS security routine may be determined to be compromised such that the OS security routine has been corrupted. The main processor component or the controller processor component may directly take action to address the corruption of the OS security routine and/or may transmit an indication to the security server that the OS security routine has been determined to be corrupted at 2162.

However, if the measure received in the response from the OS security routine is correct at 2164, then the main processor component or the controller processor component may determine that the integrity of the OS security routine has not been compromised, and may transmit an indication to that effect to the security server at 2170. It should be noted that, despite the depiction of a specific order in which the checks at 2160 and 2164 occur, other embodiments are possible in which these two checks are performed in reverse order from what is depicted.

Figure 7:
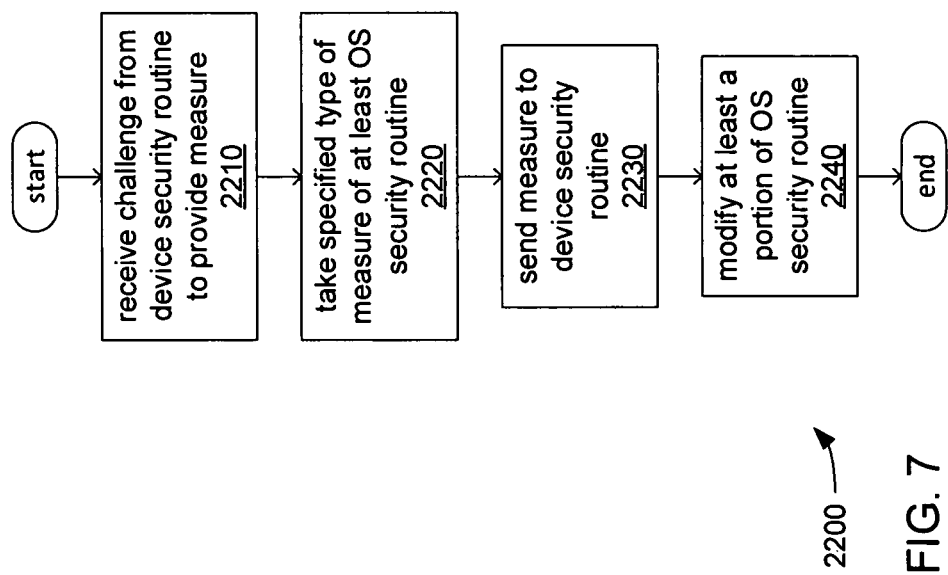
FIG. 7 illustrates another logic flow according to an embodiment.

FIG. 7 illustrates an embodiment of a logic flow 2200. The logic flow 2200 may be representative of some or all of the operations executed by one or more embodiments described herein. More specifically, the logic flow 2200 may illustrate operations performed by the processor component 550 in executing at least the OS security routine 747, and/or performed by other component(s) of the processing device 500. In particular, the logic flow 2200 is focused on operations to respond to recurringly sent challenges to provide measures of at least a portion of the OS security routine 747.

At 2210, an OS security routine executed by the main processor component of a processing device in the operating environment of an OS (e.g., the OS security routine 747 executed by the processor component 550 of the processing device 500 in the operating environment of the OS 770) may receive a challenge to provide a measure of a specified type of at least a portion of itself from a device security routine executed in another operating environment that is isolated from the operating environment of the OS to at least some degree (e.g., the device security routine 647 executed within the isolated operating environment of the controller 400 or within the secure enclave 565). As has been discussed, the other operating environment may be based on a separate processor component (e.g., the processor component 450) from the processor component that executes the OS security routine or a portion of storage to which access is restricted from routines executed externally thereto (e.g., the secure enclave 565).

At 2220, the main processor component may take the specified measure of at least a portion of the OS security routine. At 2230, the main processor component may send the measure back to the device security routine.

At 2240, the main processor component may modify at least a portion of the OS security routine. As has been discussed, such self modification may be carried in a manner that enables the device security routine and/or a security routine of a security server cooperating with the device security routine to still be able to derive an expected measure that can be matched to a measure that the OS security routine may take of itself after such self modification.

Figure 8:
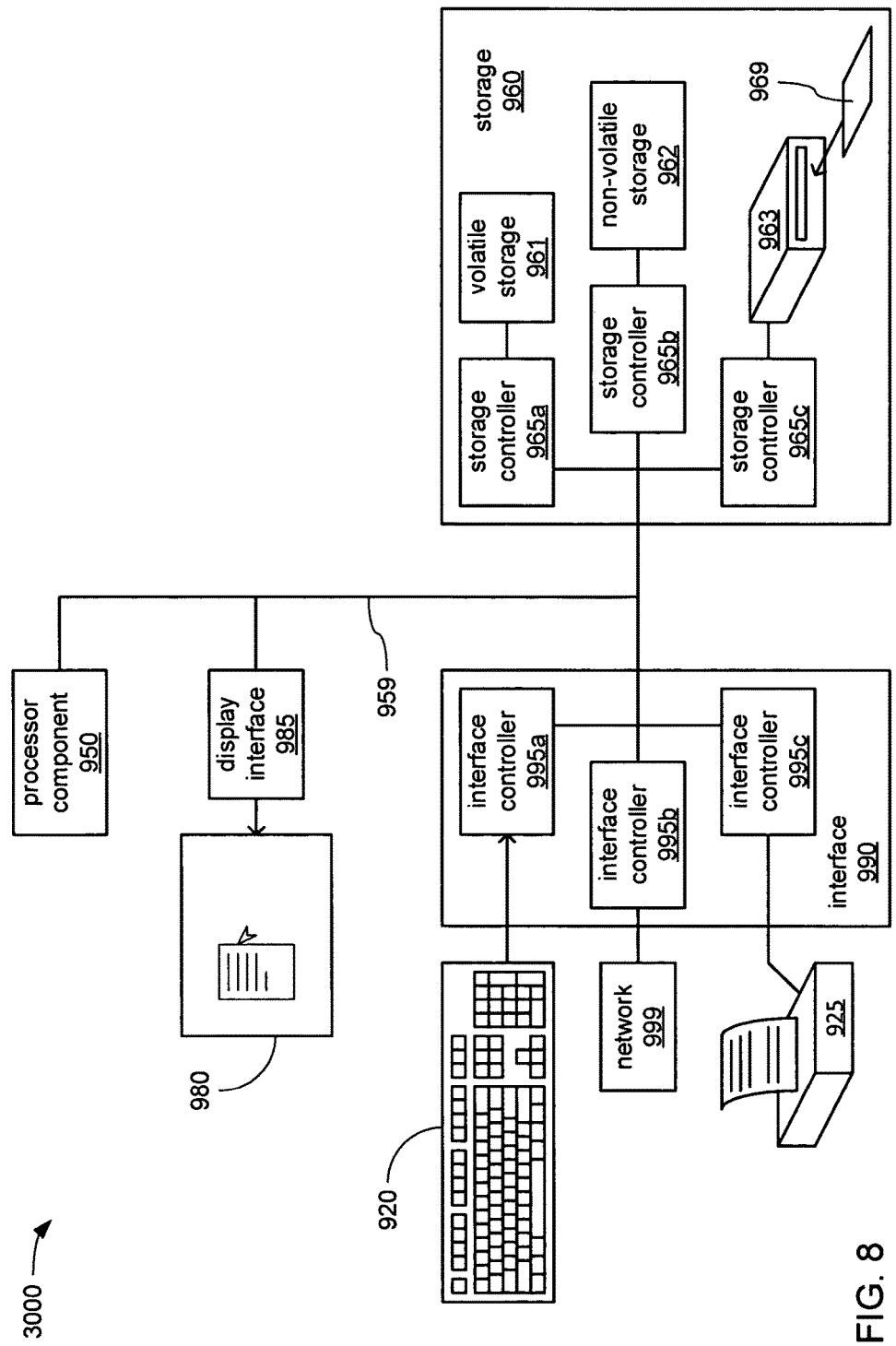
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of one or more of the devices 100, 200, 304, 305 or 500, and/or the controller 400. It should be noted that components of the processing architecture 3000 are given reference numbers in which the last two digits correspond to the last two digits of reference numbers of at least some of the components earlier depicted and described as part of these devices and/or controllers. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). By way of illustration, both an application running on a server and the server can be a component. One or more components can reside within a process and/or thread of execution, and a component can be localized on one device and/or distributed between two or more devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a device includes at least a processor component 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended)

(PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as possibly including multiple distinct types of storage is in recognition of the commonplace use of more than one type of storage device in devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a device to one or more other devices. Again, one or both of various forms of wired or wireless signaling may be employed to enable the processor component 950 to interact with input/output devices (e.g., the depicted example keyboard 920 or printer 925) and/or other devices, possibly through a network (e.g., the network 999) or an interconnected set of networks. In recognition of the often greatly different character of multiple types of signaling and/or protocols that must often be supported by any one device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a device is communicatively coupled to (or perhaps, actually incorporates) a display (e.g., the depicted example display 980), such a device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a first processor component to execute an operating system (OS) in a first operating environment within a processing device and to execute an OS security routine to recurringly verify an integrity of the OS; a challenge component within a second operating environment within the processing device that is isolated from the first operating environment to recurringly challenge the OS security routine to provide a measure of itself; and a response component within the second operating environment to analyze each measure provided by the OS security routine and an elapsed time to receive each measure from the OS security routine to verify an integrity of the OS security routine.

In Example 2, which includes the subject matter of Example 1, the OS security routine may include a measuring component to, in response to each challenge from the challenge component, take a measure of the OS security routine and send the measure to the response component.

In Example 3, which includes the subject matter of any of Examples 1-2, the OS security routine may include a self modification component to modify a portion of the OS security routine after a first measure is taken by the measuring component to cause a second measure subsequently taken by the measuring component to differ from the first measure.

In Example 4, which includes the subject matter of any of Examples 1-3, the challenge component may measure a copy of the OS security routine maintained within the second operating environment to derive a first expected measure for analysis of the first measure received from the OS security routine by the response component, may modify the copy of the OS security routine, and may measure the copy of the OS security routine again to derive a second expected measure for analysis of the second measure received from the OS security routine by the response component.

In Example 5, which includes the subject matter of any of Examples 1-4, the measuring component may be capable of taking multiple types of measure of the OS security routine, the challenge component may be capable of taking the multiple types of measure of the copy of the OS security routine, and the challenge component may specify a randomly selected one of the multiple types of measure to be taken by the measuring component in each challenge.

In Example 6, which includes the subject matter of any of Examples 1-5, the response component may receive a first measure from the OS security routine, the response component may receive a first expected measure from a security server via the network interface and may compare the first measure to the first expected measure to verify the integrity of the OS security routine, and the security server may maintain a copy of the OS security routine and may measure the copy of the OS security routine to derive the first expected measure.

In Example 7, which includes the subject matter of any of Examples 1-6, the OS security routine may include a self modification component to modify a portion of the OS security routine after the first measure is taken of the OS security routine to cause a second measure subsequently taken of the OS security routine to differ from the first measure, the security server may independently modify the copy of the OS security routine and may measure the copy of the OS security routine again to derive a second expected measure, and the response component may receive the second expected measure from the security server via the network interface and may compare the second measure to the second expected measure to again verify the integrity of the OS security routine.

In Example 8, which includes the subject matter of any of Examples 1-7, the apparatus may include a time clock, the challenge component may retrieve a first current time from the time clock upon sending a challenge to the OS security routine, the response component may retrieve a second current time from the time clock upon receiving a measure provided by the OS security routine in response to the challenge, the response component may derive the elapsed time from a difference between the first and second current times, and the response component may compare the elapsed time to a predetermined maximum elapsed time to verify the integrity of the OS security routine.

In Example 9, which includes the subject matter of any of Examples 1-8, the apparatus may include a time clock, the challenge component may trigger the time clock to begin measuring the elapsed time upon sending a challenge to the OS security routine, the response component may trigger the time clock to cease measuring the elapsed time upon receiving a measure provided by the OS security routine in response to the challenge, the response component may retrieve the elapsed time from the time clock, and the response component may compare the elapsed time to a predetermined maximum elapsed time to verify the integrity of the OS security routine.

In Example 10, which includes the subject matter of any of Examples 1-9, the apparatus may include a storage to store the OS, the OS security routine, and a device security routine comprising the challenge component and the response component; and an enclave component to cooperate with the first processor component to generate a secure enclave within a portion of the storage to provide the second operating environment, the OS and the OS security routine to remain outside the secure enclave, the device security routine to remain within the second operating environment within the secure enclave, and the first processor component to restrict accesses attempted by the OS to second operating environment within the secure enclave.

In Example 11, which includes the subject matter of any of Examples 1-10, the enclave component may include security microcode incorporated into the first processor component.

In Example 12, which includes the subject matter of any of Examples 1-11, the apparatus may include a security controller that comprises a second processor component to provide the second operating environment.

In Example 13, which includes the subject matter of any of Examples 1-12, the OS security routine, in response to a determination that the integrity of the OS is compromised, may perform at least one of reinitialize the processing device, operate a network interface to disconnect the processing device from a network, or transmit an indication of the determination to a security server via a network.

In Example 14, which includes the subject matter of any of Examples 1-13, the response component, in response to a determination that the integrity of the OS security routine is compromised, may perform at least one of reinitialize the processing device, operate a network interface to disconnect the processing device from a network, or transmit an indication of the determination to a security server via a network.

In Example 15, an apparatus includes a processor component; a network interface to couple the processor component to a network; a storage accessible to the processor component to store a copy of an operating system (OS) security routine executed within a processing device to verify an integrity of an OS executed within the processing device; a measuring component to take a measure of the copy of the OS security routine to derive a first expected measure, to modify the copy of the OS security routine in a manner analogous to a modification of the OS security routine within the processing device to cause a second measure taken of the OS security routine after the modification to differ from the first measure, and to take another measure of the copy of the OS security routine to derive a second expected measure; and a communications component to transmit the first and second expected measures to the processing device via the network to enable comparisons between the first expected measure and the first measure and between the second expected measure and the second measure to verify the integrity of the OS security routine.

In Example 16, which includes the subject matter of Example 15, the measuring component may be capable of taking multiple types of measure of the copy of the OS security routine as the first and second expected measures, another measuring component of the processing device may be capable of taking the multiple types of measure of the OS security routine as the first and second measures, the measuring component may randomly select a first type of measure of the multiple types of measure to take of the copy of the OS security routine to derive the first expected measure and to randomly select a second type of measure of the multiple types of measure to take of the copy of the OS security routine to derive the second expected measure, and the communications component may transmit to the processing device an indication of the first type of measure to be taken by the other measuring component of the OS security routine as the first measure and an indication of the second type of measure to be taken by the other measuring component of the OS security routine as the second measure.

In Example 17, which includes the subject matter of any of Examples 15-16, the processing device may include a challenge component to challenge the OS security routine to take the first and second measures of itself; a response component to receive the first and second measures of the OS security routine from the OS security routine; and a time clock to measure a first elapsed time from a first challenge by the challenge component to the OS security routine to take the first measure of itself to receipt by the response component of the first measure from the OS security routine, and to measure a second elapsed time from a second challenge by the challenge component to the OS security routine to take the second measure of itself to receipt by the response component of the second measure from the OS security routine.

In Example 18, which includes the subject matter of any of Examples 15-17, the apparatus may include an analysis component to receive from the processing device indications of first and second elapsed times, to determine if the integrity of the OS security routine is compromised based on a comparison of the first and second elapsed times to a predetermined maximum elapsed time, and in response to a determination that the integrity of the OS security routine is compromised, to perform at least one of transmit a command to the processing device to reinitialize, transmit a command to the processing device to disconnect itself from the network, transmit a command to another device coupled to the network to disconnected the processing device from the network, or transmit a command to another device coupled to the network to cease communications with the processing device via the network.

In Example 19, which includes the subject matter of any of Examples 15-18, the apparatus may include an analysis component to receive from the processing device indications of results of the comparisons, to determine if the integrity of the OS security routine is compromised based on the results, and in response to a determination that the integrity of the OS security routine is compromised, to perform at least one of transmit a command to the processing device to reinitialize, transmit a command to the processing device to disconnect itself from the network, transmit a command to another device coupled to the network to disconnected the processing device from the network, or transmit a command to another device coupled to the network to cease communications with the processing device via the network.

In Example 20, which includes the subject matter of any of Examples 15-19, the apparatus may include an analysis component to receive from the processing device an indication from the OS security routine that the integrity of the OS is compromised, and in response to the indication, to perform at least one of transmit a command to the processing device to reinitialize, transmit a command to the processing device to disconnect itself from the network, transmit a command to another device coupled to the network to disconnected the processing device from the network, or transmit a command to another device coupled to the network to cease communications with the processing device via the network.

In Example 21, a computing-implemented method includes executing, by a first processor component of a processing device, an operating system (OS) in a first operating environment; executing, by the first processor component, an OS security routine to recurringly verify an integrity of the OS; recurringly sending, from within a second operating environment of the processing device that is isolated from the first operating environment, challenges to the OS security routine to provide a measure of itself; and analyzing, within the second operating environment, each measure provided by the OS security routine and an elapsed time to receive each measure of the OS security routine at the second operating environment to verify an integrity of the OS security routine.

In Example 22, which includes the subject matter of Example 21, the method may include receiving, at the OS security routine, one of the challenges from the second operating environment for the OS security routine to measure itself; taking, at the OS security routine, a measure of at least a portion of the OS security routine; and sending the measure to the second operating environment from the OS security routine.

In Example 23, which includes the subject matter of any of Examples 21-22, the method may include modifying, at the OS security routine, at least a portion of the OS security routine after a first measure is taken of the OS security routine to cause a second measure subsequently taken of the OS security routine to differ from the first measure.

In Example 24, which includes the subject matter of any of Examples 21-23, the method may include maintaining a copy of the OS security routine within the second operating environment; measuring, within the second operating environment, the copy of the OS security routine to derive a first expected measure for analysis of the first measure received from the OS security routine; modifying, within the second operating environment, the copy of the OS security routine in a manner similar to the modification of the OS security routine; and measuring, within the second operating environment, the copy of the OS security routine again to derive a second expected measure for analysis of the second measure received from the OS security routine.

In Example 25, which includes the subject matter of any of Examples 21-24, the OS security routine may be capable of taking multiple types of measure of itself, and the method may include specifying in each challenge a type of measure randomly selected from the multiple types of measure for the OS security routine to take of itself.

In Example 26, which includes the subject matter of any of Examples 21-25, the method may include receiving, at the processing device, a first expected measure from a security server via a network, the security server to maintain a copy of the OS security routine to derive the first expected measure; receiving, at the second operating environment, a first measure from the OS security routine; and comparing, within the second operating environment, the first measure to the first expected measure to verify the integrity of the OS security routine.

In Example 27, which includes the subject matter of any of Examples 21-26, the method may include modifying, at the OS security routine, at least a portion of the OS security routine after the first measure is taken of the OS security routine to cause a second measure subsequently taken of the OS security routine to differ from the first measure; receiving, at the processing device a second expected measure from the security server via the network, the security server to independently modify the copy of the OS security routine and to measure the copy of the OS security routine again to derive the second expected measure; and comparing, within the second operating environment, the second measure to the second expected measure to again verify the integrity of the OS security routine.

In Example 28, which includes the subject matter of any of Examples 21-27, the method may include retrieving a first current time from a time clock of the processing device upon sending, from the second operating environment, a challenge to the OS security routine; retrieving a second current time from the time clock upon receiving, at the second operating environment, a measure provided by the OS security routine in response to the challenge; deriving the elapsed time from a difference between the first and second current times; and comparing the elapsed time to a predetermined maximum elapsed time to verify the integrity of the OS security routine.

In Example 29, which includes the subject matter of any of Examples 21-28, the method may include triggering a time clock of the processing device to begin measuring the elapsed time upon sending, from the second operating environment, a challenge to the OS security routine; triggering the time clock to cease measuring the elapsed time upon receiving, at the second operating environment, a measure provided by the OS security routine in response to the challenge; retrieving the elapsed time from the time clock; and comparing the elapsed time to a predetermined maximum elapsed time to verify the integrity of the OS security routine.

In Example 30, which includes the subject matter of any of Examples 21-29, the method may include storing the OS and the OS security routine within a storage coupled to the first processor component; generating a secure enclave within a portion of the storage to provide the second operating environment, the OS and the OS security routine to remain outside the secure enclave; and restricting accesses attempted by the OS to second operating environment within the secure enclave.

In Example 31, which includes the subject matter of any of Examples 21-30, the method may include generating the second operating environment within a storage coupled to a second processor component, the storage isolated from access by the first processor component.

In Example 32, which includes the subject matter of any of Examples 21-31, the method may include, in response to a determination that the integrity of the OS is compromised, performing an operation from within the first operating environment that comprises at least one of reinitializing the processing device, operating a network interface of the processing device to disconnect the processing device from a network, or transmitting an indication of the determination to a security server via a network.

In Example 33, which includes the subject matter of any of Examples 21-32, the method may include, in response to a determination that the integrity of the OS security routine is compromised, performing an operation from within the second operating environment that comprises at least one of reinitializing the processing device, operate a network interface of the processing device to disconnect the processing device from a network, or transmitting an indication of the determination to a security server via a network.

In Example 34, at least one tangible machine-readable storage medium includes instructions that when executed by a processing device, may cause the processing device to execute, by a first processor component, an operating system (OS) in a first operating environment; execute, by the first processor component, an OS security routine to recurringly verify an integrity of the OS; recurringly send, from within a second operating environment that is isolated from the first operating environment, challenges to the OS security routine to provide a measure of itself; and analyze, within the second operating environment, each measure provided by the OS security routine and an elapsed time to receive each measure of the OS security routine at the second operating environment to, verify an integrity of the OS security routine.

In Example 35, which includes the subject matter of Example 34, the processing device may be caused to receive, at the OS security routine, one of the challenges from the second operating environment for the OS security routine to measure itself; take, at the OS security routine, a measure of at least a portion of the OS security routine; and send the measure to the second operating environment from the OS security routine.

In Example 36, which includes the subject matter of any of Examples 34-35, the processing device may be caused to modify, at the OS security routine, at least a portion of the OS security routine after a first measure is taken of the OS security routine to cause a second measure subsequently taken of the OS security routine to differ from the first measure.

In Example 37, which includes the subject matter of any of Examples 34-36, the processing device may be caused to maintain a copy of the OS security routine within the second operating environment; measure, within the second operating environment, the copy of the OS security routine to derive a first expected measure for analysis of the first measure received from the OS security routine; modifying, within the second operating environment, the copy of the OS security routine in a manner similar to the modification of the OS security routine; and measuring, within the second operating environment, the copy of the OS security routine again to derive a second expected measure for analysis of the second measure received from the OS security routine.

In Example 38, which includes the subject matter of any of Examples 34-37, the OS security routine may be capable of taking multiple types of measure of itself, and the processing device may be caused to specify in each challenge a type of measure randomly selected from the multiple types of measure for the OS security routine to take of itself.

In Example 39, which includes the subject matter of any of Examples 34-38, the processing device may be caused to receive, at the processing device, a first expected measure from a security server via a network, the security server to maintain a copy of the OS security routine to derive the first expected measure; receive, at the second operating environment, a first measure from the OS security routine; and compare, within the second operating environment, the first measure to the first expected measure to verify the integrity of the OS security routine.

In Example 40, which includes the subject matter of any of Examples 34-39, the processing device may be caused to modify, at the OS security routine, at least a portion of the OS security routine after the first measure is taken of the OS security routine to cause a second measure subsequently taken of the OS security routine to differ from the first measure; receive, at the processing device a second expected measure from the security server via the network, the security server to independently modify the copy of the OS security routine and to measure the copy of the OS security routine again to derive the second expected measure; and compare, within the second operating environment, the second measure to the second expected measure to again verify the integrity of the OS security routine.

In Example 41, which includes the subject matter of any of Examples 34-40, the processing device may be caused to retrieve a first current time from a time clock upon sending, from the second operating environment, a challenge to the OS security routine; retrieve a second current time from the time clock upon receiving, at the second operating environment, a measure provided by the OS security routine in response to the challenge; derive the elapsed time from a difference between the first and second current times; and compare the elapsed time to a predetermined maximum elapsed time to verify the integrity of the OS security routine.

In Example 42, which includes the subject matter of any of Examples 34-41, the processing device may be caused to trigger a time clock to begin measuring the elapsed time upon sending, from the second operating environment, a challenge to the OS security routine; trigger the time clock to cease measuring the elapsed time upon receiving, at the second operating environment, a measure provided by the OS security routine in response to the challenge; retrieve the elapsed time from the time clock; and compare the elapsed time to a predetermined maximum elapsed time to verify the integrity of the OS security routine.

In Example 43, which includes the subject matter of any of Examples 34-42, the processing device may be caused to store the OS and the OS security routine within a storage coupled to the first processor component; generate a secure enclave within a portion of the storage to provide the second operating environment, the OS and the OS security routine to remain outside the secure enclave; and restrict accesses attempted by the OS to second operating environment within the secure enclave.

In Example 44, which includes the subject matter of any of Examples 34-43, the processing device may be caused to generate the second operating environment within a storage coupled to a second processor component, the storage isolated from access by the first processor component.

In Example 45, which includes the subject matter of any of Examples 34-44, the processing device may be caused to, in response to a determination that the integrity of the OS is compromised, perform an operation from within the first operating environment that comprises at least one of reinitializing the processing device, operating a network interface of the processing device to disconnect the processing device from a network, or transmitting an indication of the determination to a security server via a network.

In Example 46, which includes the subject matter of any of Examples 34-45, the processing device may be caused to, in response to a determination that the integrity of the OS security routine is compromised, perform an operation from within the second operating environment that comprises at least one of reinitializing the processing device, operate a network interface of the processing device to disconnect the processing device from a network, or transmitting an indication of the determination to a security server via a network.

In Example 47, at least one tangible machine-readable storage medium may include instructions that when executed by a processor component, cause the processor component to perform any of the above.

In Example 48, an apparatus may include means for performing any of the above.

The invention claimed is:

1. An apparatus to support secure processing comprising:
a storage;
a hardware processor coupled to the storage and configured to:
execute an operating system (OS) in a first operating environment;
execute an OS security routine to recurringly verify an integrity of the OS;
execute a challenge routine in a second operating environment that is isolated from the first operating environment to recurringly challenge the OS security routine to provide a measure of the OS security routine; and
execute a response routine in the second operating environment to analyze each measure provided by the OS security routine and an elapsed time to receive each measure from the OS security routine to verify an integrity of the OS security routine;
a network interface coupled to the hardware processor; and
a security server,
wherein the response routine causes the hardware processor to receive a first measure from the OS security routine, to receive a first expected measure from the security server via the network interface, and to compare the first measure to the first expected measure to verify the integrity of the OS security routine, and
wherein the security server is configured to maintain a copy of the OS security routine and to measure the copy of the OS security routine to derive the first expected measure.

2. The apparatus of claim 1, wherein the OS security routine causes the hardware processor, in response to each challenge from the challenge routine, to take a measure of the OS security routine and send the measure to the response routine.

3. The apparatus of claim 1, wherein the OS security routine causes the hardware processor to modify a portion of the OS security routine after the first measure is taken of the OS security routine so that a second measure subsequently taken of the OS security routine will differ from the first measure, and wherein the security server is configured to independently modify the copy of the OS security routine and to measure the modified copy of the OS security routine to derive a second expected measure, and wherein the response routine causes the hardware processor to receive the second expected measure from the security server via the network interface and to compare the second measure to the second expected measure to again verify the integrity of the OS security routine.

4. The apparatus of claim 1, wherein:
the storage provides a first portion for storing the OS and the OS security routine;
the storage provides a second portion that acts as a secure enclave for storing the second operating environment and that is separate from the first portion; and
the hardware processor is configured to restrict accesses attempted by the OS to second operating environment within the secure enclave.

5. The apparatus of claim 4, the secure enclave comprises security microcode.

6. A method to support secure processing comprising:
executing, by a hardware processor, an operating system (OS) in a first operating environment;
executing, by the hardware processor, an OS security routine to recurringly verify an integrity of the OS;
executing, by the hardware processor, a challenge routine in a second operating environment that is isolated from the first operating environment to recurringly challenge the OS security routine to provide a measure of the OS security routine; and
executing, by the hardware processor, a response routine in the second operating environment to analyze each measure provided by the OS security routine and an elapsed time to receive each measure from the OS security routine to verify an integrity of the OS security routine, wherein the response routine causes the hardware processor to receive a first measure from the OS security routine, to receive a first expected measure from a security server via a network interface, and to compare the first measure to the first expected measure to verify the integrity of the OS security routine, and wherein the security server is configured to maintain a copy of the OS security routine and to measure the copy of the OS security routine to derive the first expected measure.

7. The method of claim 6, wherein the OS security routine causes the hardware processor, in response to each challenge from the challenge routine, to take a measure of the OS security routine and send the measure to the response routine.

8. The method of claim 6, wherein the OS security routine causes the hardware processor to modify a portion of the OS security routine after the first measure is taken of the OS security routine so that a second measure subsequently taken of the OS security routine will differ from the first measure, and wherein the security server is configured to independently modify the copy of the OS security routine and to measure the modified copy of the OS security routine to derive a second expected measure, and wherein the response routine causes the hardware processor to receive the second expected measure from the security server via the network interface and to compare the second measure to the second expected measure to again verify the integrity of the OS security routine.

9. The method of claim 6, further comprising:
storing the OS and the OS security routine in a first portion of storage;
providing a second portion in the storage that acts as a secure enclave for storing the second operating environment and that is separate from the first portion; and
restricting accesses attempted by the OS to second operating environment within the secure enclave.

10. The method of claim 9, the secure enclave comprises security microcode.

11. A non-transitory computer-readable medium containing computer-executable instructions that, when executed by a processor, cause the processor to perform a method to support secure processing, the method comprising:
executing an operating system (OS) in a first operating environment;
executing an OS security routine to recurringly verify an integrity of the OS;
executing a challenge routine in a second operating environment that is isolated from the first operating environment to recurringly challenge the OS security routine to provide a measure of the OS security routine; and
executing a response routine in the second operating environment to analyze each measure provided by the OS security routine and an elapsed time to receive each measure from the OS security routine to verify an integrity of the OS security routine, wherein the response routine causes the processor to receive a first measure from the OS security routine, to receive a first expected measure from a security server via a network interface, and to compare the first measure to the first expected measure to verify the integrity of the OS security routine, and wherein the security server is configured to maintain a copy of the OS security routine and to measure the copy of the OS security routine to derive the first expected measure.

12. The non-transitory computer-readable medium of claim 11, wherein the OS security routine causes the processor, in response to each challenge from the challenge routine, to take a measure of the OS security routine and send the measure to the response routine.

13. The non-transitory computer-readable medium of claim 11, wherein the OS security routine causes the processor to modify a portion of the OS security routine after the first measure is taken of the OS security routine so that a second measure subsequently taken of the OS security routine will differ from the first measure, and wherein the security server is configured to independently modify the copy of the OS security routine and to measure the modified copy of the OS security routine to derive a second expected measure, and wherein the response routine causes the processor to receive the second expected measure from the security server via the network interface and to compare the second measure to the second expected measure to again verify the integrity of the OS security routine.

14. The non-transitory computer-readable medium of claim 11, wherein the method further comprises:
storing the OS and the OS security routine in a first portion of storage;
providing a second portion in the storage that acts as a secure enclave for storing the second operating environment and that is separate from the first portion; and
restricting accesses attempted by the OS to second operating environment within the secure enclave.

15. The non-transitory computer-readable medium of claim 14, the secure enclave comprises security microcode.

* * * * *